(12) United States Patent
Phillips

(10) Patent No.: US 8,439,277 B2
(45) Date of Patent: May 14, 2013

(54) AIR CONDITIONING SYSTEM

(75) Inventor: Peter George Phillips, South Australia (AU)

(73) Assignee: SMAC Technologies Pty Ltd, Norwood, South Australia (AU)

( * ) Notice: Subject to any disclaimer, the term of this patent is extended or adjusted under 35 U.S.C. 154(b) by 849 days.

(21) Appl. No.: 12/515,643

(22) PCT Filed: Nov. 19, 2007

(86) PCT No.: PCT/AU2007/001779
§ 371 (c)(1),
(2), (4) Date: Aug. 19, 2009

(87) PCT Pub. No.: WO2008/061297
PCT Pub. Date: May 29, 2008

(65) Prior Publication Data
US 2010/0065650 A1 Mar. 18, 2010

(30) Foreign Application Priority Data
Nov. 20, 2006 (AU) .............................. 2006906435

(51) Int. Cl.
*G05D 22/00* (2006.01)
*F24F 3/14* (2006.01)
(52) U.S. Cl.
USPC ......................... 236/44 A; 236/44 C; 62/186

(58) Field of Classification Search ................. 236/12.1, 236/12.13, 13, 44 A, 44 C, 49.3; 62/186
See application file for complete search history.

(56) References Cited

U.S. PATENT DOCUMENTS

| | | | |
|---|---|---|---|
| 5,228,302 A | 7/1993 | Eiermann | |
| 5,309,725 A | 5/1994 | Cayce | |
| 6,604,688 B2 * | 8/2003 | Ganesh et al. | 236/49.3 |
| 6,698,219 B2 * | 3/2004 | Sekhar et al. | 62/179 |

FOREIGN PATENT DOCUMENTS

DE 10027467 12/2001

\* cited by examiner

*Primary Examiner* — Marc Norman
(74) *Attorney, Agent, or Firm* — Novak Druce Connolly Bove + Quigg LLP

(57) ABSTRACT

The present invention provides an air conditioning system that is capable of treating a conditioned space by treating outdoor air from outside the conditioned space and return air from inside the conditioned space, and mixing the outdoor air with the return air to form supply air for the conditioned space, the air conditioning system including an outdoor air latent cooling treatment stage configured to provide parallel airflow with a return air sensible cooling treatment stage, and a means for mixing outdoor air with return air to form conditioned space supply air, wherein the outdoor air latent cooling treatment stage includes at least a dehumidification heat exchanger, combination pre-cooling and heat reclaim heat exchangers, and a heat transfer pump, and the return air sensible cooling treatment stage includes at least a sensible cooling heat exchanger.

18 Claims, 3 Drawing Sheets

AIR CONDITIONING SYSTEM

CROSS-REFERENCE TO RELATED APPLICATIONS

This application is a §371 national stage entry of International Application No. PCT/AU2007/001779, filed Nov. 19, 2007, which claims priority to Australian Application No. 2006906435, filed Nov. 20, 2006, both of which are hereby incorporated by reference in their entirety.

RELATED APPLICATIONS

This international patent application claims priority from Australian provisional patent application 2006906435, the specification of which is hereby incorporated by reference.

FIELD OF THE INVENTION

The present invention relates to an improved air conditioning system, including a method and apparatus for controlling the improved air conditioning system.

BACKGROUND OF THE INVENTION

Conventional air conditioning design theories were challenged in the 1990's by a series of innovative thoughts developed by the late Dr Allan Shaw. These thoughts culminated with the air conditioning control system described in Dr Shaw's U.S. Pat. No. 6,269,650. This patent, and the system it describes, is now owned by the present applicant and will be referred to throughout this specification as the "Shaw system".

The Shaw system is a system that operates air conditioning functions in parallel to separate the process of treating latent loads (typically to remove moisture from outdoor air) and sensible loads (typically internal air which is dry). The Shaw system differs from conventional air conditioning processes in that, rather than drawing untreated outdoor air and then cooling it within the total air conditioning system, incoming outdoor air is pre-treated (dehumidified and cooled) by a first, separate outdoor-air heat exchanger before being merged with typically dry (treated or untreated) inside air that generally has been cooled. The two air streams are merged, to be then delivered to the conditioned space.

The Shaw system is a twin heat exchanger system that provides the additional benefit of permitting the passage of the same cooling medium stream (typically water) through both heat exchangers in series to maximize efficiency. This twin heat exchanger process also avoids the traditional need for high energy inputs on two levels, firstly to overcool and then to re-heat air in order to maintain a desired level of humidity in a conditioned space. Coupled with a control system that permits integrated control of humidity, temperature and chiller operation, it has proven to be possible for the air treatment processes of the Shaw system to optimize energy performance at all times in the operating cycle to provide significantly reduced energy consumption and accurate control over humidity and temperature fluctuations in a conditioned space.

However, the Shaw system was designed for the reasonably typical cooling situations where a building's requirements only dictate the use of standard amounts of ventilation (such as about 10 to 20% outdoor air) and only needs to produce an environment in accordance with reasonably standard comfort levels. Indeed, at ventilation levels of outdoor air up to about 25%, and for typically average conditioned space temperature and humidity aims, the Shaw system has been found to operate successfully to provide the above benefits.

On the other hand, for specialist applications where the ventilation requirements require the use of higher levels of outdoor air (such as in hospitals and specialist laboratories, where levels of outdoor air of 40 to 50% are generally required), it has been found that the Shaw system has a tendency to overcool the conditioned space. Also, the Shaw system may still encounter energy inefficiencies if required to produce, for example, abnormal levels of dehumidification such as would be required to provide very low dew point temperatures. It has thus been an aim of the present invention to provide improvements to the Shaw system that allow ready adoption of the Shaw system in situations such as these, and also in situations where there is a need to provide and control multiple thermal zones within the conditioned space with individual dry bulb and general absolute humidity control.

Before turning to a summary of the present invention, it must be appreciated that the above description of the prior art has been provided merely as background to explain the context of the invention. It is not to be taken as an admission that any of the material referred to was published or known, or was a part of the common general knowledge in Australia or elsewhere.

SUMMARY OF THE INVENTION

In very general terms, the air conditioning system provided by the present invention improves upon the Shaw system described above in that it utilises at least two additional heat exchangers and a variable speed pump to recover energy used to dehumidify that is not required to satisfy the dry bulb conditions of the conditioned space. Psychrometrically, the improved air conditioning system of the present invention provides controlled separation from the saturation curve.

The present invention provides an air conditioning system that is capable of treating a conditioned space by treating outdoor air from outside the conditioned space and return air from inside the conditioned space, and mixing the outdoor air with the return air to form supply air for the conditioned space, the air conditioning system including:

an outdoor air latent cooling treatment stage configured to provide parallel airflow with a return air sensible cooling treatment stage, and a means for mixing outdoor air with return air to form conditioned space supply air, wherein the outdoor air latent cooling treatment stage includes at least a dehumidification heat exchanger, combination pre-cooling and heat reclaim heat exchangers, and a heat transfer pump, and the return air sensible cooling treatment stage includes at least a sensible cooling heat exchanger.

The reference to "parallel airflow" above, and throughout this specification, is to be understood to mean that the two treatment stages are configured so that the latent cooling is conducted upon the outdoor air prior to it being mixed with treated return air (treated in the sense of the return air having undergone sensible cooling)—it does not similarly require that the sensible cooling be conducted upon the return air prior to it being mixed with treated outdoor air. Indeed, in one form of the present invention, it is envisaged that the treated outdoor air may be mixed with untreated return air, following which the sensible cooling may be conducted upon the mixed airflow (being the treated outdoor air and the untreated return air), to thereafter produce the conditioned space supply air. The reference to "parallel" is also of course not to be read as a geometric limitation related to the physical location or arrangement of any equipment utilised in the system of the present invention.

In a preferred form though, the configuration of the outdoor air latent cooling treatment stage and the return air sensible cooling treatment stage will be such that both treatments are conducted on their respective airflows prior to mixing, the mixing means thus being capable of mixing treated outdoor air with treated return air to form the conditioned space supply air.

The heat exchange medium for the sensible cooling heat exchanger is ideally passed in series with the dehumidification heat exchanger. The series configuration reduces the temperature difference, which increases flow rate through the dehumidification heat exchanger, thereby improving the heat exchange efficiency and its effectiveness to operate at a higher apparatus dew point to enable a chiller to operate at a higher saturated suction temperature. The second phase of the series circuit, namely the sensible cooling heat exchanger, then preferably utilizes the remaining cooling impetus. Additionally, the reduced temperature difference increases flow rate through the sensible cooling heat exchanger, thereby improving heat exchanger efficiency and its effectiveness to operate at a high temperature.

The air conditioning system of the present invention also preferably includes a demand driven primary heat exchange medium set point and a demand driven secondary heat exchange flow rate. In this respect, it will be appreciated that the energy required to generate a cooling medium at a lower saturated suction temperature is higher than the energy that is required to generate a cooling medium at a higher saturated suction temperature. Elevation of the saturated suction temperature through demand from heat exchangers operating at higher efficiency permits the cooling medium saturated suction temperature to be raised, thereby reducing the energy required to generate the cooling effect.

As mentioned above, the outdoor air latent cooling treatment stage includes combination pre-cooling and heat reclaim heat exchangers. The reference to "combination" pre-cooling and heat reclaim heat exchangers is a reference to the matching of the amount of heat transfer from the pre-cooling heat exchanger to the heat reclaim heat exchanger. Indeed, both heat exchangers are dependent on each other through the heat exchange fluid. Also, the heat exchange fluid cooled by the heat reclaim heat exchanger is transferred to the pre-cooling heat exchanger, which then utilises the cooled heat exchange fluid to pre-cool the air stream. Ideally, the warmed heat exchange fluid then returns to the heat reclaim heat exchanger to again be cooled. In this respect, the flow process is complimentary and regulated by demand.

In a first embodiment of the present invention, the improved air conditioning system ideally extends the Shaw system mentioned above beyond the normal air conditioning space requirements (of up to 25% outdoor air) to the use of up to 100% outdoor air, potentially entirely eliminating the use of a return air heat exchanger.

This first embodiment preferably utilises an outdoor air latent cooling treatment stage that includes a single heat exchanger for dehumidification cooling and two heat exchangers for heat reclaim in order to provide separation from the saturation curve, without reheat, and thereby to provide energy improvements. In particular, the outdoor air latent cooling treatment stage preferably includes a heat reclaim pre-cooling heat exchanger, a chilled water dehumidification heat exchanger, and a further heat reclaim heat exchanger. In this embodiment, the first stage of cooling is provided by the (overcool energy transfer) heat reclaim pre-cooling heat exchanger.

In this embodiment, the energy required for dehumidification also preferably sensibly cools the outdoor air stream. This energy is ideally shifted by use of a closed heat reclaim loop to pre-cool the dehumidification air stream, such that the energy that is used to dehumidify the outdoor air stream can be reclaimed by the heat reclaim heat exchanger. This heat exchanger is preferably connected by a heat reclaim water loop that is filled by a connection to a chilled water system, and the energy is transferred by a pump to the heat reclaim pre-cooling heat exchanger. In this respect, the amount of energy transferred will generally be determined by the conditioned space sensible heat load requirement, and the rate at which the energy is shifted will generally dictate the separation temperature from the saturation curve, thereby providing a variable sensible heat ratio that would otherwise be achieved by reheating by an additional heat source.

This first embodiment preferably also utilises a return air sensible cooling or heating treatment stage that includes any one or more of a chilled water heat exchanger, a condenser water heat reclaim heat exchanger, and/or a heating water heat exchanger. Ideally then, condenser water can be diverted from a cooling tower to provide heating (if required) to maintain conditioned space dry bulb conditions.

In this embodiment, a chilled water heat exchanger can provide sensible cooling for the conditioned space that cannot otherwise be provided by the outdoor air dehumidified stream delivered at or near the saturation curve. The chilled water heat exchanger is preferably connected in series to the chilled water dehumidification heat exchanger of the outdoor air latent cooling treatment stage.

A heating water heat exchanger can then provide additional heating capacity if the condenser water system can not provide sufficient conditioned space heating.

Of course, following the above described separate treatment of the outdoor air and the return air, the two air streams are preferably mixed to provide a single supply air stream to be delivered to the space to be conditioned.

In terms of preferred configurations for the pipework for this first embodiment, the pipework will preferably be configured to incorporate, as mentioned above, the series flow for the dehumidification heat exchanger to the sensible heat exchanger. Both pipework circuits will preferably incorporate a three-way bypass configuration to divert flow from either or both heat exchangers. The circuits will ideally incorporate a flow meter to measure the chilled water flow rate, and will also ideally include temperature sensors to measure the entering, inter stage and leaving chilled water temperature.

The heat reclaim pipework circuit will preferably also incorporate the heat transfer pump to transfer energy from the heat reclaim pre-cooling heat exchanger to the further heat reclaim heat exchanger, and a flow meter to measure the water flow rate. This circuit will ideally include temperature sensors to measure the entering and leaving temperatures.

Furthermore, the condenser water pipework circuit will preferably also incorporate a two-way control valve to regulate the heating capacity, as well as a flow sensor and temperature sensors to measure the entering and leaving temperatures. Further still, the heating water pipework circuit will preferably also incorporate a two-way or a three-way control valve, and a flow meter to measure heating water flow and temperature sensors to measure the entering and leaving water temperature.

In a second embodiment of the present invention, the principles of the first embodiment are extended to respond to the demands of variable air volume systems. This second embodiment ideally achieves the lowest supply air temperature that will achieve conditioned space dehumidification, thereby reducing the amount of supply air required to offset conditioned space heat load demands with the highest chilled water temperature possible to achieve conditioned space load requirements. The second embodiment thus reduces the amount of supply air required to adequately achieve individual dry bulb control and generally acceptable controlled absolute humidity.

The outdoor air latent cooling treatment stage in the second embodiment preferably again includes a single heat exchanger for dehumidification cooling and two heat exchangers for heat reclaim in order to provide separation from the saturation curve, without reheat, and thereby to provide energy improvements. These heat exchangers are preferably configured in the same manner as mentioned above in relation to the first embodiment. However, in this second embodiment there is preferably also included a damper that regulates the amount of conditioned space air that can be returned for mixing with the outdoor air stream, together with a damper that permits excessive conditioned space air to be spilled to atmosphere. These two dampers operate sympathetically to increase the flow of outdoor air to provide additional outdoor air to satisfy space sensible cooling loads when the outdoor air temperature is suitable for sensible cooling.

In this second embodiment, when the ambient air condition is below the desired conditioned space dry bulb temperature and dew point, the outdoor air itself is of course an appropriate medium to satisfy the conditioned space cooling demand. In a response to provide cooling, the bypass will thus modulate open to provide additional air through the outdoor air heat exchangers. The supply air fan speed will then increase to provide additional airflow and, as a consequence, additional cooling.

In relation to the return air sensible cooling treatment stage of the second embodiment, the return air stream will preferably incorporate a return air fan that responds to a demand from the warmest thermal zone. The return air stream preferably incorporates one or more of a condenser water heat reclaim heat exchanger, a chilled water heat exchanger, a heating water heat exchanger, a return air fan, and/or a spill air damper. In this embodiment, condenser water will preferably be diverted from the cooling tower to provide heating to maintain conditioned space dry bulb conditions.

The chilled water heat exchanger of the return air sensible cooling treatment stage preferably provides sensible cooling for the conditioned space that cannot be otherwise provided by the dehumidified outdoor air delivered at or near the saturation curve. The chilled water heat exchanger is preferably series connected to the chilled water dehumidification heat exchanger of the outdoor air latent cooling treatment stage.

In a preferred form of this second embodiment, a return air fan coupled to a variable speed drive will modulate the amount of return air for recirculation to achieve adequate sensible cooling or to act to provide spill (or exhaust) air. Further, a spill air damper will open whenever there is excessive conditioned space pressurization during the outdoor air cooling mode.

Of course, following the above described separate treatment of the outdoor air and the return air, the two air streams are preferably mixed to provide a single supply air stream to be delivered to the space to be conditioned, as with the first embodiment described above.

In terms of preferred configurations for the pipework circuits for this second embodiment, the pipework will again preferably be configured to incorporate series flow for the dehumidification heat exchanger to the sensible heat exchanger. Both pipework circuits will ideally incorporate a three-way bypass configuration to divert flow from either or both heat exchangers, and a flow meter to measure the chilled water flow rate. The circuits will ideally include temperature sensors to measure the entering, inter stage and leaving chilled water temperature.

The heat reclaim pipework circuit will again preferably incorporate the heat transfer pump to transfer energy from the heat reclaim pre-cooling heat exchanger to the second heat reclaim heat exchanger, and also preferably a flow meter to measure the water flow rate. The circuit will also preferably include temperature sensors to measure the entering and leaving temperatures. Furthermore, the condenser water pipework circuit will again preferably also incorporate a two-way control valve to regulate the heating capacity, as well as a flow sensor and temperature sensors to measure the entering and leaving temperatures. Further still, the heating water pipework circuit will again preferably also incorporate a two-way or a three-way control valve, and a flow meter to measure heating water flow and temperature sensors to measure the entering and leaving water temperature.

Turning to a general description of a third embodiment of the present invention, the third embodiment is a low dew point control process that extends the Shaw system beyond normal air conditioning space requirements. The air conditioning system of the third embodiment again includes an outdoor air latent cooling treatment stage and a return air sensible cooling treatment stage, but does so utilizing four dehumidification cooling steps including two heat reclaim steps and one sensible cooling step to provide energy improvements.

The outdoor air latent cooling treatment stage of this third embodiment preferably includes a brine heat reclaim pre-cooling heat exchanger, a first stage chilled water dehumidification heat exchanger, a second stage brine dehumidification heat exchanger, and a further brine heat reclaim heat exchanger. Thus, the first stage of cooling in the third embodiment is preferably provided by the brine heat reclaim pre-cooling heat exchanger, and the energy required for dehumidification sensibly pre-cools the outdoor air stream. This energy is again shifted by use of a closed heat reclaim loop to pre-cool the outdoor air stream.

In this embodiment, the first stage of dehumidification is preferably provided by chilled water. This chilled water is generated at a high coefficient of performance. The second stage of dehumidification is then preferably provided by a low temperature brine heat exchanger, brine being generated at a lower coefficient of performance than chilled water. Further, the energy that is used to dehumidify the outdoor air stream is reclaimed by the heat reclaim heat exchanger, which is connected by a heat reclaim water (brine) loop and pump to the brine heat reclaim pre-cooling heat exchanger.

Unlike the first and second embodiment, the return air stream incorporates both sensible cooling and sensible heating. The return air sensible cooling treatment stage of the third embodiment preferably includes one or more of a condenser water heat reclaim heat exchanger, a chilled water heat exchanger, and a heating water heat exchanger. In this respect, condenser water is again diverted from a cooling tower to provide heating to maintain conditioned space dry bulb conditions. Additionally, the chilled water heat exchanger provides sensible cooling for the conditioned space, with the heat exchanger being series connected to the first stage chilled water dehumidification heat exchanger.

Of course, following the above described separate treatment of the outdoor air and the return air, the two air streams are preferably mixed to provide a single supply air stream to be delivered to the space to be conditioned.

In terms of preferred configurations for the pipework circuits for this third embodiment, the pipework circuits will again preferably be configured to incorporate series flow for the dehumidification heat exchanger to the sensible heat exchanger, in the same manner as described above.

In terms of the pipework for the brine loop, the brine pipework circuit will preferably incorporate either two-way or three-way valves to control the dehumidification process. This pipework will ideally incorporate a flow meter to measure the brine flow rate. This pipework will also preferably include temperature sensors to measure the entering and leaving temperatures.

The heat reclaim pipework circuit will preferably also incorporate the heat transfer pump to transfer energy from the brine energy heat reclaim pre-cooling heat exchanger to the heat reclaim pre-cooling heat exchanger, and a flow meter to measure the brine flow rate. This circuit will preferably include temperature sensors to measure the entering and leaving temperatures. The heat reclaim pipework will preferably be connected to the brine pipework to provide a low temperature capable heat exchange medium.

Further, the condenser water pipework circuit will again preferably incorporate a two-way control valve to regulate the heating capacity, a flow sensor and temperature sensors to measure the entering and leaving temperatures. Further still, the heating water pipework will again preferably also incorporate a two-way or a three-way control valve, a flow meter to measure heating water flow, and temperature sensors to measure the entering and leaving water temperature.

The present invention also provides a method of controlling the improved air conditioning system. The control method preferably includes the use of various inputs (dependent upon, amongst other things, the nature of the embodiment of the invention), including:

Conditioned space dry bulb and relative humidity inputs;
Outdoor air dry bulb and relative humidity inputs; and
Outdoor air flow input and heat exchange medium flow input.

The control method also preferably includes the use of various strategies (again dependent upon, amongst other things, the nature of the embodiment of the invention), including:

An outdoor air dehumidification strategy;
A return air sensible cooling strategy;
A heat reclaim cooling strategy;
An outdoor air free cooling strategy;
A heat exchange medium delivery temperature reset strategy; and
An inter-stage heat exchange medium selection strategy.

In terms of these strategies, in a very general sense they can be summarized as outlined in the following paragraphs.

The outdoor air dehumidification strategy preferably incorporates demand motivated control over an outdoor air dehumidification heat exchanger and a heat exchange medium (chilled water) control valve.

The return air sensible cooling strategy preferably incorporates demand motivated control over a return air sensible cooling heat exchanger and the chilled water control valve, together with a return air fan.

The heat reclaim cooling strategy preferably incorporates demand motivated control over an outdoor air pre-cooling heat exchanger, a heat reclaim heat exchanger and a closed circuit recirculating pump.

The outdoor air free cooling strategy preferably incorporates demand motivated control over a conditioned space supply air fan, the return air fan, and an outdoor air bypass damper.

The heat exchange medium delivery temperature reset strategy preferably incorporates demand motivated control over a heat exchange medium (chilled water) delivery temperature reset.

The inter-stage heat exchange medium selection strategy preferably incorporates demand control over the heat exchange medium (such as chilled water) delivery temperature set point and a supercool heat exchange medium (such as brine) delivery temperature set point.

In terms of the preferred control methodology for the first and second embodiments of the present invention, twin heat exchanger dehumidification such as that utilised by the present invention preferably employs one heat exchanger (such as a chilled water heat exchanger) in the outdoor air stream to provide latent cooling to achieve upper limit humidity control, and a second heat exchanger (such as a second chilled water heat exchanger) in the return air stream to provide additional sensible cooling to satisfy conditioned space dry bulb conditions. Dehumidification sensible heat transfer thus employs two heat exchangers partnered to the outdoor air dehumidification heat exchanger to regulate the amount of sensible cooling provided as part of the dehumidification process. Sensible cooling that is required to depress the outdoor air stream to achieve dehumidification is preferably reclaimed by an additional heat exchanger and a circulating pump in a closed circuit and is transferred to a pre-cooling heat exchanger in the outdoor air stream.

In this situation, where a high quantity of outdoor air is required for the conditioned space (per the first embodiment of the present invention), the control system will thus employ the controlled items to manage the conditioned space conditions as follows:

the outdoor air dehumidification heat exchanger provides the required latent cooling;
the return air heat exchanger provides additional sensible cooling beyond that provided by the dehumidification process; and
when the dehumidification process provides more sensible cooling than the conditioned space requires, the heat reclaim system transfers the surplus sensible cooling post dehumidification (saturation separation) to cooling required to initiate the dehumidification process.

In the second embodiment, variable volume boxes will additionally typically be used to satisfy the requirements for two or more thermal zones in the conditioned space. While a first requirement for all embodiments of the present invention is to provide adequate air circulation within the conditioned space to assist with comfort conditions, a second requirement (met by this second embodiment) is to provide supply air control to satisfy a variance in zone thermal loads.

In this respect, when ambient air has the ability to provide cooling to the conditioned space, the introduction of additional outdoor air will be regulated to satisfy the conditioned space load, which can be achieved (as mentioned above) by the preferred use of a bypass damper. In one form, a simple air fan operating in response to conditioned space loads can function as a bypass damper to introduce additional outdoor air and maintain conditioned space conditions. Indeed, a return air fan could then operate to achieve a differential between the supply air and the return air that is equivalent to the minimum required outdoor air quantity. With this in mind, return air will ideally be spilled (exhausted) to outdoor via a spill air damper.

In this situation, where an air handling cooling plant is coupled to multiple sub zone cooling regulating devices for the delivery of air to variable air volume boxes (VAV) to manage the conditioned space (per the second embodiment of the present invention), the control system will thus employ the controlled items to manage the conditioned space conditions as follows:

- when the outdoor air dry bulb temperature and absolute humidity level are both less than the desired conditioned space condition, the quantity of outdoor air is varied to satisfy the conditioned space dry bulb conditions;
- the outdoor air dehumidification heat exchanger provides sensible cooling to satisfy the general conditioned space requirements;
- when the outdoor air dehumidification process provides insufficient sensible cooling to satisfy the conditioned space sensible cooling requirements, the return air fan is employed with the return air heat exchanger to provide additional sensible cooling; and
- when the dehumidification process provides more sensible cooling than the conditioned space requires, the heat reclaim system transfers the surplus sensible cooling post dehumidification (saturation separation) to cooling required to initiate the dehumidification process.

In terms of the preferred control methodology for the third embodiment of the present invention, there is preferably employed both a chilled water (as a primary heat exchange medium) heat exchanger and a brine (as a secondary, or super cooling, heat exchange medium) heat exchanger in the outdoor air stream to provide the latent cooling to achieve upper limit humidity control. As with the first and second embodiments, a chilled water heat exchanger can thus also be provided in the return air stream to provide additional sensible cooling to satisfy conditioned space dry bulb conditions.

In this situation, where a low absolute humidity is required for the conditioned space (per the third embodiment of the present invention), the control system will employ the controlled items to manage the conditioned space conditions as follows:

- the first stage outdoor air dehumidification heat exchanger provides the initial dehumidification process to satisfy the conditioned space latent cooling requirements (this stage will preferably utilise cold energy produced by a chilling plant with a high coefficient of performance (energy conversion efficiency));
- the second stage outdoor air dehumidification heat exchanger provides the final dehumidification process to satisfy the conditioned space latent cooling requirements (this stage preferably utilises cold energy produced by a chilling plant with a coefficient of performance (energy conversion efficiency) less than the first stage dehumidification process chilling plant);
- the return air heat exchanger provides additional sensible cooling beyond that provided by the dehumidification processes;
- when the dehumidification process provides more sensible cooling than the conditioned space requires, the heat reclaim system transfers the surplus sensible cooling post dehumidification (saturation separation) to cooling required to initiate the dehumidification process; and
- when the potential to reclaim heat is not sufficient, supplementary heating can be provided by a higher energy source (heat can be transferred from the heat of rejection (condenser water) of the refrigeration plant or from a conventional combustion fuel type system).

For all embodiments of the present invention, the control system preferably utilizes Proportional and Integral (P+I) control theory to provide variable outputs for the controlled elements to achieve conditions in the conditioned space close to set point. All items of plant preferably incorporate variable drives to respond to the varied input signals.

BRIEF DESCRIPTION OF THE DRAWINGS

Having briefly described the general concepts involved with the present invention, three preferred embodiments of an improved air conditioning system will now be described that are in accordance with the present invention. However, it is to be understood that the following description is not to limit the generality of the above description.

In the drawings:

FIG. 1b is the psychrometric chart for the first embodiment shown in FIG. 1a;

FIG. 2b is the psychrometric chart for the second embodiment shown in FIG. 2a;

FIG. 3b is the psychrometric chart for the third embodiment shown in FIG. 3a.

DESCRIPTION OF PREFERRED EMBODIMENTS

As mentioned above, in a first embodiment of the present invention the improved air conditioning system of the present invention ideally extends the Shaw system mentioned above beyond the normal air conditioning space requirements (of up to 25% outdoor air) to the use of up to 100% outdoor air, potentially entirely eliminating the use of a return air heat exchanger.

Figure 1A:
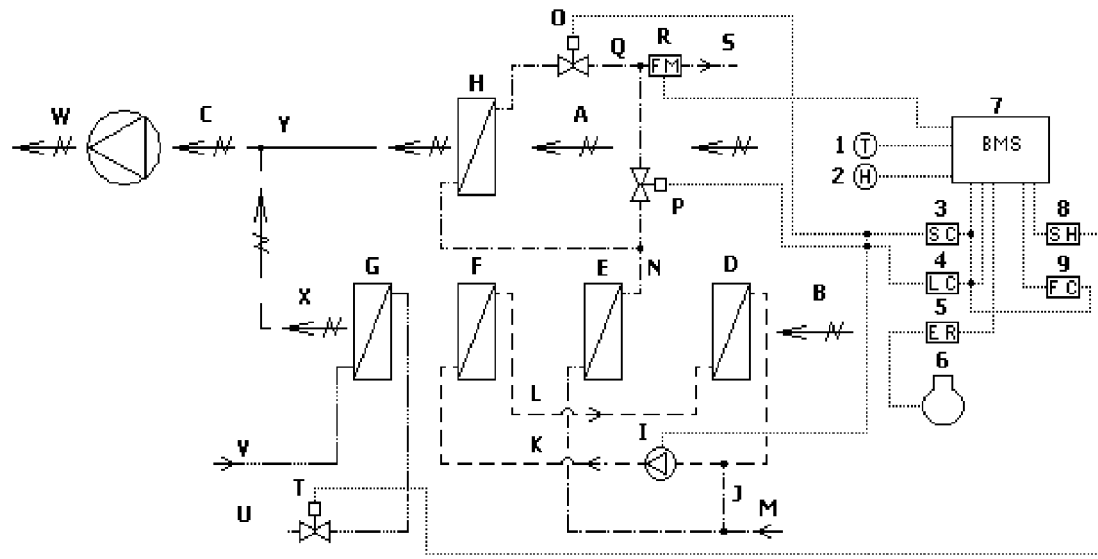
FIG. 1a is a flow diagram of a first embodiment of an air conditioning system in accordance with the present invention.
Figure 1B:
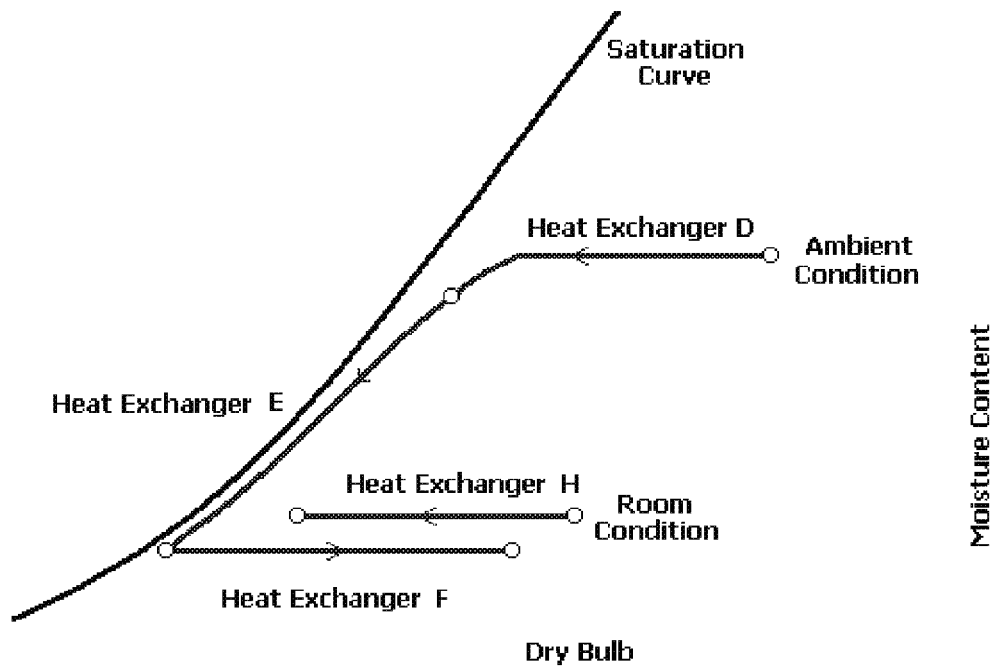

This first embodiment is illustrated by the flow diagram of FIG. 1a and the psychrometric chart of FIG. 1b. For ease of understanding, the following description will first provide a general overview of the flow diagram of FIG. 1a, followed by a more detailed explanation (in a table) of the different elements of the flow diagram. A brief explanation of the psychrometric chart of FIG. 1b will then be provided.

In general terms, shown in the flow diagram of FIG. 1a is an air conditioning system where return air A from the conditioned space is psychrometrically treated separately from the outdoor air B (for ventilation) to achieve independent control of latent and sensible cooling. Following this separate treatment of the return air A and the outdoor air B, the two air streams are then mixed to provide a single conditioned space supply air stream W to be delivered to the space to be conditioned.

The cooling process for the return air stream A is principally sensible cooling, which is conducted in the return air sensible cooling treatment stage represented in this embodiment by a heat exchanger H placed in the return air stream A.

The cooling process for the outdoor air stream B is principally latent cooling, which is conducted in the outdoor air latent cooling treatment stage represented in this embodiment by heat exchangers D, E, and F placed in the outdoor air stream B. The first heat exchanger D pre-cools the outdoor air stream B utilizing reclaimed energy, reducing the dry bulb temperature of the stream, and commences the dehumidifying process. The second heat exchanger E dehumidifies the outdoor air stream B to an absolute humidity level that will achieve the desired relative humidity level within the conditioned space. The third heat exchanger F reclaims sensible heat that is not required to satisfy the conditioned space sensible cooling load. The result of this third stage of heat exchange is a separation of the outdoor air stream B from the saturation curve. In this respect, the amount of the separation is regulated by a heat transfer pump I connecting the first heat exchanger D to the third heat exchanger F.

The principal heat exchange medium (in this embodiment, chilled water) is used to maximize heat exchanger efficiency. The cold entering flow of chilled water is used to provide the driving potential for the outdoor air second heat exchanger E (which in this embodiment is referred to as a dehumidification heat exchanger), with the subsequently warmed heat exchange medium then passing to the heat exchanger H in the return air A path, which heat exchanger H is referred to as a sensible cooling heat exchanger.

The temperature of the chilled water, before entry to the air conditioning system, is regulated by a demand from the current conditions in the conditioned space. For example, when maximum flow conditions have been provided to the heat exchangers and the conditions in the conditioned space require additional dehumidification or sensible cooling, the initial temperature of the chilled water is scheduled down to achieve additional heat exchange, leading to satisfaction of the conditioned space dry bulb and relative humidity requirements.

Finally in relation to FIG. 1a, and before providing a detailed explanation of each of the elements shown in FIG. 1a, it will be appreciated that sensible heating for the conditioned space (if necessary) is achieved by the addition of a further heat exchanger in either the return air A or the outdoor air B streams. In FIG. 1a, this further heat exchanger G is shown in the outdoor air B stream downstream of the outdoor air latent cooling treatment stage. In this embodiment, it can be seen that latent heating is not being provided, as there is no such further heat exchanger provided in the return air A stream.

The following table provides a more detailed explanation of the various elements illustrated in the flow diagram of FIG. 1a:

| | |
|---|---|
| A | Return air (sensible cooling) stream |
| | Air recirculated from the conditioned space will be typically used to act as the medium to provide sensible cooling to the conditioned space. |
| B | Outdoor air (dehumidification) stream |
| | Air that is provided for ventilation of the space will be typically used to act as the medium to provide latent cooling to the conditioned space. |
| C | Supply air stream |
| | Air that is delivered to the conditioned space will be cooled to offset the heat load within the conditioned space. The heat load of the space will require a varying ratio and quantum of sensible and latent cooling dependent on the variability of ambient and conditioned space heat in and out flow. |
| D | Outdoor air stream pre cooling heat exchanger |
| | The outdoor air stream B passes over the heat exchanger D. A heat reclaim cooling medium (L to K) passes through the heat exchanger D. The direction of flow is counter flow: the warmer airflow is cooled by the warmer cooling medium flow - the cooler airflow is cooled by the cooler medium flow. The outdoor air stream B gives up heat to the heat reclaim cooling medium. The outdoor air steam B will be achieve sensible cooling and, depending on the cooling medium flow temperature, latent cooling may also be achieved. |
| E | Outdoor air stream dehumidification heat exchanger |
| | The outdoor air stream B passes over the heat exchanger E. A cooling medium (M to N) passes through the heat exchanger E. The direction of flow is counter flow: the warmer airflow is cooled by the warmer cooling medium flow - the cooler airflow is cooled by the cooler medium flow. The outdoor air stream B gives up heat to the cooling medium. The outdoor air steam B will achieve principally latent cooling, although some sensible cooling will also be achieved. |
| F | Outdoor air stream heat reclaim heat exchanger |
| | The outdoor air stream B passes over the heat exchanger F. A heat reclaim heating medium (K to L) passes through the heat exchanger F. The direction of flow is counter flow: the warmer airflow is heated by the warmer heating medium flow - the cooler airflow is heated by the cooler medium flow. The outdoor air stream B takes up heat from the heat reclaim heating medium. The outdoor air steam B will achieve sensible heating - no latent heat exchange will be achieved. |
| G | Outdoor air stream sensible heating heat exchanger |
| | The outdoor air stream B passes over the heat exchanger G. A heating medium (V to U) passes through the heat exchanger F. The direction of flow is counter flow: the warmer airflow is heated by the warmer heating medium flow - the cooler airflow is heated by the cooler medium flow. The outdoor air stream B takes up heat from the heating medium. The outdoor air steam B will achieve sensible heating - no latent heat exchange will be achieved. |
| H | Return air stream sensible cooling heat exchanger |
| | The return air stream A passes over the heat exchanger H. A cooling medium (N to Q) passes through the heat exchanger H. The direction of flow is counter flow: the warmer airflow is cooled by the warmer cooling medium flow - the cooler airflow is cooled by the cooler medium flow. The return air stream A gives up heat to the cooling medium. The return air steam A will achieve sensible cooling and, depending on the cooling medium flow temperature, latent cooling may also be achieved. |

| | |
|---|---|
| I | Heat transfer pump<br>The heat transfer pump I generates flow through the heat reclaim medium piping circuit (K and L) and two heat exchangers (D and F). The sequence of flow through the heat reclaim piping circuit is as follows: flow generated by the heat transfer pump I passes through pipe K, through heat exchanger F, through pipe L, and then through heat exchanger D, returning to the heat transfer pump I. |
| J | Feed and expansion pipe<br>The feed and expansion pipe J connects the heat reclaim piping circuit (K and L) to the cooling medium circuit M. The connection fills the heat reclaim piping circuit with a heat exchange medium from the cooling medium circuit M. The connection permits temperature generated expansion and contraction within the heat reclaim circuit (K and L). |
| K | Warm heat reclaim pipe<br>The warm heat reclaim pipe transfers warm heat reclaim medium from heat exchanger D to heat exchanger F. |
| L | Cool heat reclaim pipe<br>The cool heat reclaim pipe transfers cool heat reclaim medium from heat exchanger F to heat exchanger D. |
| M | Cold cooling medium pipe<br>The cold cooling medium pipe transfers cold cooling medium from the cold generator (a chiller, shown as reference numeral 6, albeit without some piping showing) to the outdoor air stream dehumidification heat exchanger E. |
| N | Inter stage cooling medium pipe<br>The inter stage cooling medium pipe transfers cool cooling medium from the dehumidification heat exchanger E to either the sensible cooling heat exchanger H or the return pipe S to the cold generator (chiller) 6. |
| O | Sensible cooling heat exchanger control valve<br>The sensible cooling heat exchanger control valve O regulates the amount of flow of cool heat exchange medium N that passes through the sensible cooling heat exchanger H. An increase in flow of the cool heat exchange cooling medium increases the amount of heat exchange achieved by the sensible cooling heat exchanger H. As a consequence of cool cooling medium flow, the return air steam A will achieve sensible cooling and, depending on the cooling medium flow temperature and flow rate, latent cooling may also be achieved. |
| P | Dehumidification heat exchanger control valve<br>The dehumidification cooling heat exchanger control valve P regulates the amount of flow of cold heat exchange medium M that passes through the dehumidification heat exchanger E. An increase in flow of the cold heat exchange cooling medium increases the amount of heat exchange achieved by the dehumidification heat exchanger E. As a consequence of cold cooling medium flow, the outdoor air steam B will achieve latent cooling. Sensible cooling will also be achieved at a rate determined by the dehumidification process.<br>Where there is an absence of a dehumidification requirement, and where there is a sensible cooling requirement, the dehumidification cooling heat exchanger control valve P will also be required to regulate the amount of flow of the cold cheat exchange medium M. An increase in flow of the cold heat exchange cooling medium increases the amount of heat exchange achieved by the dehumidification heat exchanger E. As a consequence of cold cooling medium flow, the outdoor air steam B will achieve sensible cooling. Depending on the cooling medium flow temperature, latent cooling may also be achieved. |
| Q | Warm cooling medium pipe<br>The warm cooling medium pipe Q transfers warm cooling medium from heat exchanger H back to the cold generator (chiller) 6. |
| R | Cooling medium flow meter<br>The cooling medium flow meter R measures the amount of flow in the return cooling medium pipe S. |
| S | Return cooling medium pipe<br>The return cooling medium pipe R transfers the mixed return cooling medium back to the cold generator (chiller) 6. Cooling medium that has be utilized in the dehumidification heat exchanger E and the sensible cooling heat exchanger H come together to then return to the cold generator (chiller) 6. |
| T | Dehumidification air stream sensible heating heat exchanger control valve<br>The outdoor air stream sensible heating heat exchanger control valve T regulates the amount of flow of hot heat exchange medium V that passes through the sensible heating heat exchanger G. An increase in flow of the hot heat exchange heating medium increases the amount of heat exchange achieved by the sensible heating heat exchanger G. The outdoor air steam B will achieve sensible heating - no latent heat exchange will be achieved. |
| U | Hot heating medium pipe<br>The hot heating medium pipe transfers hot heating medium from heat exchanger G via a heat generator (not shown) to the outdoor air stream dehumidification heat exchanger E. |
| V | Warm heating medium pipe<br>The warm return heating medium pipe V transfers the warm heating medium from the outdoor air stream dehumidification heat exchanger E back to the heat generator. |

| | |
|---|---|
| W | Conditioned space supply air |
| | The conditioned space supply air W is a mixture of the outdoor air stream B (the dehumidification air stream) and the return air stream A (the sensible cooling air stream). The conditioned space supply air stream W transports sensible and latent cooling and sensible heating potential from the series and parallel heat exchangers D, E, F, G and H to offset the conditioned space and ventilation airflow heat load to provide the targeted dry bulb and relative humidity conditions. |
| X | Treated outdoor air stream |
| | The treated outdoor air stream X transports sensible and latent cooling, and sensible heating potential, from the series heat exchangers D, E, F and G. |
| Y | Treated return air stream |
| | The treated return air stream Y transports sensible and latent cooling from heat exchanger G. |
| 1 | Space dry bulb temperature input device |
| | The space dry bulb temperature input device 1 measures the conditioned space dry bulb temperature as an input to the space environmental management system 7. |
| 2 | Space relative humidity input device |
| | The space relative humidity input device 2 measures the conditioned space relative humidity as an input to the space environmental management system 7. |
| 3 | Sensible cooling control algorithm |
| | The sensible cooling control algorithm 3 determines the amount of sensible cooling to be provided from heat exchangers H and E to offset the conditioned space and ventilation air flow sensible cooling requirement. |
| | 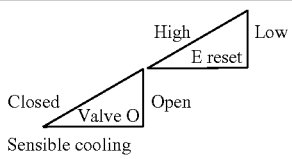<br>Sensible cooling |
| | In response to the space dry bulb temperature input device 1, the following control actions in sequence will increase the cooling capacity to maintain the desired space dry bulb temperature set point:<br>Modulate the sensible cooling heat exchanger control valve O from closed to open.<br>Vary the cooling medium reset algorithm 5 from high to low to reset the cold cooling medium generator (chiller) 6 flow temperature from warm to cold. |
| 4 | Latent cooling control algorithm |
| | The latent cooling control algorithm 4 determines the amount of latent cooling to be provided from heat exchangers D, E and F to offset the conditioned space and ventilation air flow latent cooling requirement. |
| | 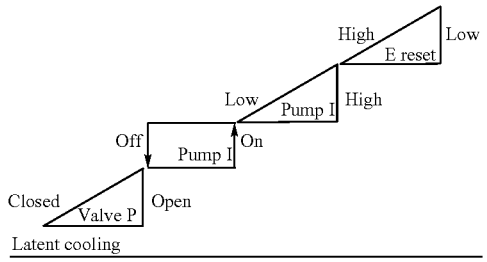<br>Latent cooling |
| | In response to the space relative humidity input device 2, the following control actions in sequence will increase the dehumidification capacity to maintain the desired space relative humidity set point:<br>Modulate the dehumidification cooling heat exchanger control valve P from closed to open.<br>Energize the heat transfer pump I.<br>Vary the speed of the heat transfer pump I from low to high.<br>Vary the cooling medium reset algorithm 5 from high to low to reset the cold cooling medium generator (chiller) 6 flow temperature from warm to cold. |
| 5 | Cooling medium reset algorithm |
| | The cooling medium reset algorithm 5 accepts feedback from the space dry bulb temperature input device 1 and space relative humidity input device 2 to determine whether the cold cooling medium M is acceptable to achieve the targeted dry bulb and relative humidity conditions. If either the targeted space dry bulb temperature or space relative humidity is not achieved, the cold cooling medium generator (chiller) 6 flow temperature is reset. |
| 6 | Cold cooling medium generator (chiller) |
| | The cold cooling medium generator (chiller) 6 is a mechanical device that removes the heat energy absorbed by heat exchangers E and H. |

| | |
|---|---|
| 7 | Space environmental management system<br>The space environmental management system 7 is a computer based control system that accepts input from the space dry bulb temperature input device 1 and the space relative humidity input device 2 and, through the sensible cooling control algorithm 3 and the latent cooling control algorithm 4, provides output to the sensible cooling heat exchanger control valve O and the dehumidification cooling heat exchanger control valve P to achieve the targeted space dry bulb temperature and relative humidity.<br>The space environmental management system 7 also accepts input from the space dry bulb temperature input device 1 to, through the sensible heating control algorithm 8, provide output to the sensible heating heat exchanger control valve T to achieve the targeted space dry bulb temperature. |
| 8 | Sensible heating control algorithm<br>The sensible heating control algorithm 8 determines the amount of sensible heating to be provided from heat exchangers D, F and G to offset the conditioned space and ventilation air flow sensible heating requirement.<br>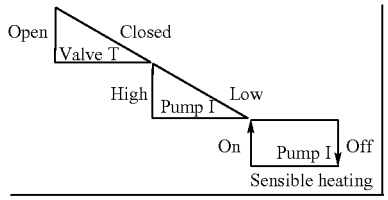<br>In response to the space dry bulb temperature input device 1, the following control actions in sequence will increase the heating capacity to maintain the desired space dry bulb temperature set point:<br>When the latent cooling control algorithm 4 is active, and input from the space dry bulb temperature input device 1 is below set point,<br>energize the heat transfer pump I.<br>vary the speed of the heat transfer pump I from low to high.<br>When the latent cooling control algorithm 4 is not active, and input from the space dry bulb temperature input device 1 is below set point,<br>modulate the outdoor air stream sensible heating heat exchanger control valve T from closed to open. |
| 9 | Cold cooling medium flow algorithm<br>The cold cooling medium flow algorithm 9 limits the flow of the cold cooling medium M and S. Input from the cold cooling medium flow meter R is compared to the determined maximum cold cooling medium flow rate and retards the action of the dehumidification heat exchanger control valve P to limit the flow of cold cooling medium (M to S) to the determined maximum flow rate.<br>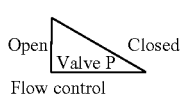<br>In response to the cooling medium flow meter R, the following control actions in unison sequence will retard the cooling medium flow to limit flow to the desired cold cooling medium flow rate set point:<br>Modulate the dehumidification cooling heat exchanger control valve P from open to closed. |

With regard to the chart of FIG. 1b, the psychrometric process is as follows: the first heat exchanger D pre-cools the outdoor air B; the second heat exchanger E uses chilled water to dehumidify the outdoor air B; and the third heat exchanger F shifts energy to the first heat exchanger D to pre-cool. This enables the outdoor air stream B to be adequately dehumidified with a reduced proportion of sensible cooling. As can be seen, separation from the saturation curve is achieved. The amount of separation is achieved by the regulation of heat transfer from the first heat exchanger D to the third heat exchanger F.

By way of summary with regard to the first embodiment of FIGS. 1a and 1b, and as mentioned above, the psychrometric solution is achieved using separate air paths. As the Shaw system used the outdoor air stream to dehumidify prior to mixing, the first embodiment of the present invention uses this same Shaw methodology but extended to four heat transfer processes. With this in mind, and as will be understood from the above description, utilising heat reclaim permits variability in the dehumidification process to provide separation from the saturation curve that can be regulated to satisfy the conditions of the conditioned space, with minimal or eliminated need for reheat.

Turning now to the second embodiment of the present invention, and again as mentioned above, the principles of the first embodiment are extended to respond to the demands of variable air volume systems. This second embodiment ideally achieves the lowest supply air temperature that will achieve conditioned space dehumidification, thereby reducing the amount of supply air required to offset conditioned space heat load demands with the highest chilled water temperature possible to achieve conditioned space load requirements. The second embodiment thus reduces the amount of supply air required to adequately achieve individual dry bulb control and generally acceptable controlled absolute humidity.

Figure 2A:
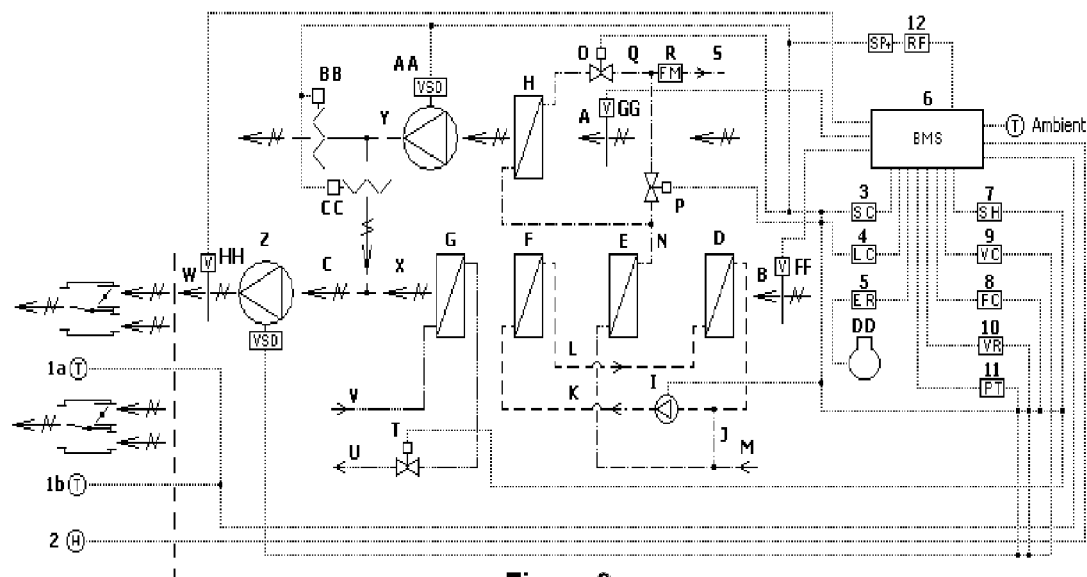
FIG. 2a is a flow diagram of a second embodiment of an air conditioning system in accordance with the present invention.
Figure 2B:
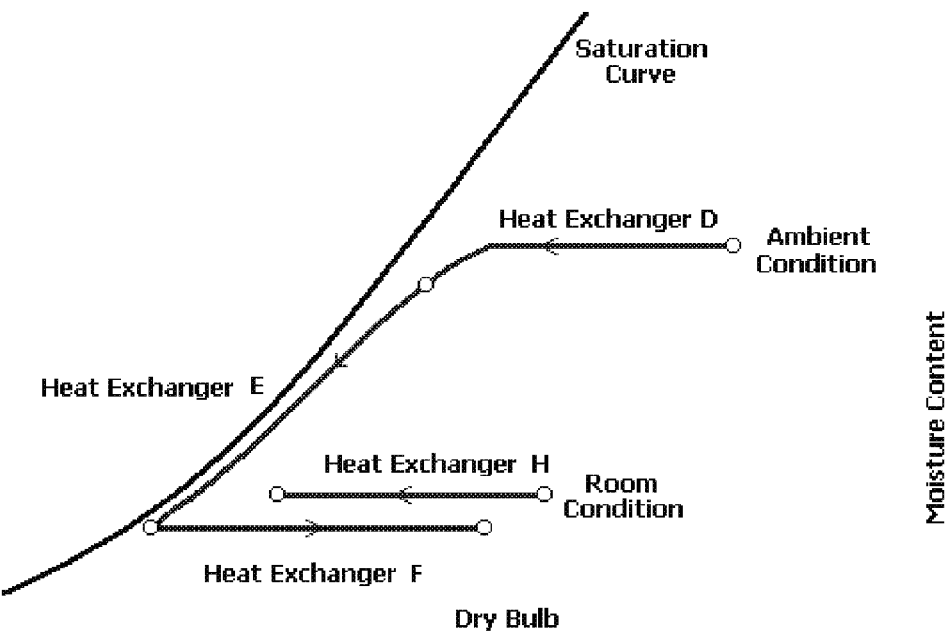

This second embodiment is illustrated by the flow diagram of FIG. 2a and the psychrometric chart of FIG. 2b. For ease of understanding, the following description will first provide a general overview of the flow diagram of FIG. 2a, followed by a more detailed explanation (in a table) of the different elements of the flow diagram. A brief explanation of the psychrometric chart of FIG. 2b will then be provided.

Illustrated in the flow diagram of FIG. 2a is an air conditioning system that provides a conditioned space supply air stream W to multiple variable volume zone boxes (EEa, EEb, etc). The sensible heat delivery is regulated by individual zone controls. The latent cooling is regulated by a general condition of the conditioned space.

As with the first embodiment of FIGS. 1a and 1b, outdoor air B (for ventilation) is psychrometrically treated separately from the return air A to achieve independent control of latent and sensible cooling. Following this separate treatment, the two treated air streams are mixed to provide the single conditioned space supply air stream W to be delivered to the space to be conditioned.

The cooling process for the return air stream A is principally sensible cooling, which is conducted in the return air sensible cooling treatment stage, represented by the heat exchanger H placed in the return air stream A. The amount of sensible cooling required is achieved by the scheduling of the return air volume. As sensible load increases, so too does the return air quantity.

Again, the cooling process for the outdoor air stream B is principally latent cooling, which is conducted in the outdoor air latent cooling treatment stage, represented by heat exchangers D, E and F placed in the outdoor air stream B. The first heat exchanger D pre-cools the outdoor air B utilising reclaimed energy, reducing the dry bulb temperature and commencing the dehumidifying process. The second heat exchanger E dehumidifies the outdoor air B to an absolute humidity level that will achieve the desired relative humidity level within the conditioned space. The third heat exchanger F reclaims sensible heat that is not required to satisfy the conditioned space sensible cooling load. The result of the third stage of heat exchange is a separation of the outdoor air stream B from the saturation curve. The amount of separation is regulated by a heat transfer pump I connecting the first heat exchanger D and the third heat exchanger F.

The principal heat exchange medium (in this case again being chilled water) is again used to maximize heat exchanger efficiency. Thus, the cold entering flow is used to provide the driving potential for the second heat exchanger E (the outdoor air dehumidification heat exchanger), and the subsequently warmer water then passes to the heat exchanger H of the return air stream A, namely the return air sensible cooling heat exchanger.

When the outdoor conditions are themselves suitable to provide sensible cooling and dehumidification, a return air "bypass" damper CC can be modulated closed to introduce additional outdoor air to satisfy the sensible cooling requirements of whatever zones are present. When further cooling is required, the conditioned space supply air W is increased. The excess pressurization provided by such additional outdoor air is relieved from the conditioned space by opening an ambient air relief damper BB and regulating the speed of the return air fan AA.

The temperature of the heat exchange medium entering the system (the chilled water) is again regulated by a demand from the conditions of the conditioned space. When maximum flow conditions have been provided to the heat exchangers, and the conditioned space conditions require additional dehumidification or sensible cooling, delivery temperature of the chilled water is scheduled down to achieve additional heat exchange, which leads to satisfaction of the conditioned space dry bulb and general relative humidity requirements.

Finally, and as for the first embodiment of FIGS. 1a and 1b, sensible heating in this second embodiment for the conditioned space can be achieved by the addition of a further heat exchanger in either the return air A or the outdoor air B streams, as is shown in FIG. 2a as the heat exchanger G in the outdoor air stream B. Latent heating is not provided by this embodiment.

The following table provides a more detailed explanation of the various elements illustrated in the flow diagram of FIG. 2a:

| | |
|---|---|
| A | Return air (sensible cooling) stream |
| | Air recirculated from the conditioned space will be typically used to act as the medium to provide sensible cooling to the conditioned space. |
| B | Outdoor air (dehumidification) air stream |
| | Air that is provided for ventilation of the space will be typically used to act as the medium to provide latent cooling to the conditioned space. |
| C | Supply air stream |
| | Air that is delivered to the conditioned space will be cooled to offset the heat load within the conditioned space. The heat load of the space will require a varying ratio and quantum of sensible and latent cooling dependent on the variability of ambient and conditioned space heat in and out flow. |
| D | Outdoor air stream pre cooling heat exchanger |
| | The outdoor air stream B passes over the heat exchanger D. A heat reclaim cooling medium (L to K) passes through the heat exchanger D. The direction of flow is counter flow: the warmer airflow is cooled by the warmer cooling medium flow - the cooler airflow is cooled by the cooler medium flow. The outdoor air stream B gives up heat to the heat reclaim cooling medium. The outdoor air steam B will achieve sensible cooling and, depending on the cooling medium flow temperature, latent cooling may also be achieved. |
| E | Outdoor air stream dehumidification heat exchanger |
| | The outdoor air stream B passes over the heat exchanger E. A cooling medium (M to N) passes through the heat exchanger E. The direction of flow is counter flow: the warmer airflow is cooled by the warmer cooling medium flow - the cooler airflow is cooled by the cooler medium flow. The outdoor air stream B gives up heat to the cooling medium. The outdoor air steam B will achieve principally latent cooling, although some sensible cooling will also be achieved. |

| | |
|---|---|
| F | Outdoor air stream heat reclaim heat exchanger
The outdoor air stream B passes over the heat exchanger F. A heat reclaim heating medium (K to L) passes through the heat exchanger F. The direction of flow is counter flow: the warmer airflow is heated by the warmer heating medium flow - the cooler airflow is heated by the cooler medium flow. The outdoor air stream B takes up heat from the heat reclaim heating medium. The outdoor air steam B will achieve sensible heating - no latent heat exchange will be achieved. |
| G | Outdoor air stream heating heat exchanger
The outdoor air stream B passes over the heat exchanger G. A heating medium (V to U) passes through the heat exchanger F. The direction of flow is counter flow: the warmer airflow is heated by the warmer heating medium flow - the cooler airflow is heated by the cooler medium flow. The outdoor air stream B takes up heat from the heating medium. The outdoor air steam B will achieve sensible heating - no latent heat exchange will be achieved. |
| H | Return air stream sensible cooling heat exchanger
The return air stream A passes over the heat exchanger H. A cooling medium (N to Q) passes through the heat exchanger H. The direction of flow is counter flow: the warmer airflow is cooled by the warmer cooling medium flow - the cooler airflow is cooled by the cooler medium flow. The return air stream A gives up heat to the cooling medium. The return air stream A will achieve sensible cooling and, depending on the cooling medium flow temperature, latent cooling may also be achieved. |
| I | Heat transfer pump
The heat transfer pump I generates flow through the heat reclaim medium piping circuit (K and L) and two heat exchangers D and F. The sequence of flow through the heat reclaim piping circuit is, flow generated by pump I passes through pipe K, through heat exchanger F, through pipe L, then through heat exchanger D, before returning to pump I. |
| J | Feed and expansion pipe
The feed and expansion pipe J connects the heat reclaim piping circuit (K and L) to the cooling medium circuit M. The connection fills the heat reclaim piping circuit with a heat exchange medium from M. The connection permits temperature generated expansion and contraction within the heat reclaim circuit (K and L). |
| K | Warm heat reclaim pipe
The warm heat reclaim pipe transfers warm heat reclaim medium from the heat exchanger D to the heat exchanger F. |
| L | Cool heat reclaim pipe
The cool heat reclaim pipe transfers cool heat reclaim medium from the heat exchanger F to the heat exchanger D. |
| M | Cold cooling medium pipe
The cold cooling medium pipe transfers cold cooling medium from the cold generator (chiller) DD to the outdoor air dehumidification heat exchanger E. |
| N | Inter stage cooling medium pipe
The inter stage cooling medium pipe transfers cool cooling medium from the dehumidification heat exchanger E to either the sensible cooling heat exchanger H or the return pipe S to the cold generator (Chiller) DD. |
| O | Sensible cooling heat exchanger control valve
The sensible cooling heat exchanger control valve O regulates the amount of flow of cool heat exchange medium N that passes through the sensible cooling heat exchanger H. An increase in flow of the cool heat exchange cooling medium increases the amount of heat exchange achieved by the sensible cooling heat exchanger H. As a consequence of cool cooling medium flow, the return air steam A will achieve sensible cooling and, depending on the cooling medium flow temperature and flow rate, latent cooling may also be achieved. |
| P | Dehumidification heat exchanger control valve
The dehumidification cooling heat exchanger control valve P regulates the amount of flow of cold heat exchange medium M that passes through the dehumidification heat exchanger E. An increase in flow of the cold heat exchange cooling medium increases the amount of heat exchange achieved by the dehumidification heat exchanger E. As a consequence of cold cooling medium flow, the outdoor air steam B will achieve latent cooling. Sensible cooling will also be achieved at a rate determined by the dehumidification process.
Where there is an absence of a dehumidification requirement, and where there is a sensible cooling requirement, the dehumidification cooling heat exchanger control valve P will also be required to regulate the amount of flow of the cold heat exchange medium M. An increase in flow of the cold heat exchange cooling medium increases the amount of heat exchange achieved by the dehumidification heat exchanger E. As a consequence of cold cooling medium flow, the outdoor air steam B will achieve sensible cooling. Depending on the cooling medium flow temperature, latent cooling may also be achieved. |
| Q | Warm cooling medium pipe
The warm cooling medium pipe Q transfers warm cooling medium from sensible cooling heat exchanger Hback to the cold generator (chiller) DD. |

| | |
|---|---|
| R | Cooling medium flow meter |
| | The cooling medium flow meter R measures the amount of flow in the return cooling medium pipe S. |
| S | Return cooling medium pipe |
| | The return cooling medium pipe R transfers the mixed return cooling medium back to the cold generator (chiller) DD. Cooling medium that has be utilized in the dehumidification heat exchanger E and the sensible cooling heat exchanger H come together to then return to the cold generator (chiller) DD. |
| T | Outdoor air stream sensible heating heat exchanger control valve |
| | The outdoor air stream sensible heating heat exchanger control valve T regulates the amount of flow of hot heat exchange medium V that passes through the sensible heating heat exchanger G. An increase in flow of the hot heat exchange heating medium increases the amount of heat exchange achieved by the sensible heating heat exchanger G. The outdoor air steam B will achieve sensible heating - no latent heat exchange will be achieved. |
| U | Hot heating medium pipe |
| | The hot heating medium pipe transfers hot heating medium from the sensible heating heat exchanger G, via a heat generator, to the outdoor air stream dehumidification heat exchanger E. |
| V | Warm heating medium pipe |
| | The warm return heating medium pipe V transfers the warm heating medium from the outdoor air stream dehumidification heat exchanger E back to the heat generator. |
| W | Conditioned space supply air |
| | The conditioned space supply air W is a mixture of the outdoor air stream B (the dehumidification air stream) and the return air stream A (the sensible cooling air stream). The conditioned space supply air stream W transports sensible and latent cooling, and sensible heating potential, from the series and parallel heat exchangers D, E, F, G and H to offset the conditioned space and ventilation airflow heat load to provide the targeted dry bulb and relative humidity conditions. |
| X | Treated outdoor air stream |
| | The treated outdoor air stream X transports sensible and latent cooling, and sensible heating potential, from the series heat exchangers D, E, F and G. |
| Y | Treated return air stream |
| | The treated return air stream Y transports sensible and latent cooling from heat exchanger G. |
| Z | Supply air fan |
| | The supply air fan Z transfers air from the heat exchanger processes to the variable volume boxes 'EEa', 'EEb' etc. The supply air fan Z will be driven by an electric motor fitted with a variable speed drive. The speed of the supply air fan Z will vary in response to the dry bulb temperature control airflow management sequences. |
| AA | Return air fan |
| | The return air fan AA transfers air from the conditioned space through the sensible heat exchange process to either the mix with the treated outdoor air stream X or to be relieved to ambient. The return air fan AA will be driven by an electric motor fitted with a variable speed drive. The speed of the return air fan AA will vary in response to the dry bulb temperature control airflow management sequences. |
| BB | Ambient relief air damper |
| | The ambient relief air damper BB will permit return air to be relieved to ambient. The ambient relief air damper BB position will be set in response to the dry bulb temperature control airflow management sequences. |
| CC | Return air damper |
| | The return air damper CC will permit the treated return air stream Y to be mixed with the treated outdoor air stream X. The return air damper CC position will be set in response to the dry bulb temperature control airflow management sequences. |
| DD | Cold cooling medium generator (chiller) |
| | The cold cooling medium generator (chiller) DD is a mechanical device that removes the heat energy absorbed by heat exchangers E and H. |
| EEa | Zone variable volume boxes |
| EEb | The zone variable volume boxes EEa, EEb, etc regulate the delivery of |
| . | conditioned space supply air W to offset zone space heat loads. The |
| . | conditioned space supply air stream W transports sensible and latent cooling |
| . | and sensible heating potential from the series and parallel heat exchangers |
| etc | D, E, F, G and H to offset the combined zone conditioned space and ventilation airflow heat load to provide the targeted zone dry bulb and general space relative humidity conditions. |
| 1a | Zone dry bulb temperature input devices |
| 1b | The zone dry bulb temperature input devices 1a, 1b, etc measure the zone conditioned space dry bulb temperature as an input to the space environmental management system 7. |
| 2 | Space relative humidity input device |
| | The space relative humidity input device 2 measures the conditioned space relative humidity as an input to the space environmental management system 7. |

| | |
|---|---|
| 3 | Sensible cooling control algorithm<br>The sensible cooling control algorithm 3 determines the amount of sensible cooling to be provided from the zone variable volume boxes EEa, EEb, etc and the heat exchangers H and E to offset the zone conditioned spaces and ventilation air flow sensible cooling requirement.<br>The zone variable volume boxes EEa, EEb, etc will operate individually.<br>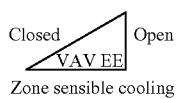<br>Zone sensible cooling<br><br>In response to the space dry bulb temperature input device 1a, the following control action will increase the cooling capacity to maintain the desired space dry bulb temperature set point:<br>Modulate the zone variable volume box from closed to open.<br>(Where reheat facility is provided within the zone variable volume boxes EEa, EEb, etc, operation of the reheater will be energized when the variable volume box is closed to minimum supply air Y.)<br>The delivery of thermal capacity from the heat exchangers E and H will be determined by the zone variable volume box with the highest sensible cooling demand.<br>When the ambient temperature is below the space dry bulb temperature set point, the return air damper CC will be closed and the ambient relief air damper BB will be open.<br>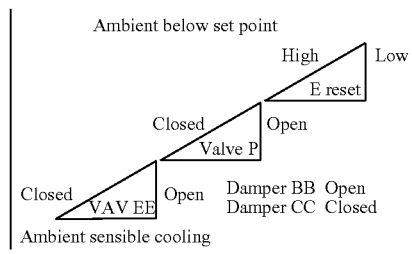<br>Ambient sensible cooling<br><br>In response to the warmest zone space dry bulb temperature input device 1, the following control actions in sequence will increase the cooling capacity to maintain the desired space dry bulb temperature set point:<br>Modulate the dehumidification cooling heat exchanger control valve P from closed to open.<br>Vary the cooling medium reset algorithm 5 from high to low to reset the cold cooling medium generator (chiller) DD flow temperature from warm to cold.<br>When the ambient temperature is above the space dry bulb temperature set point, the return air damper CC will be open and the ambient relief air damper BB will be closed.<br>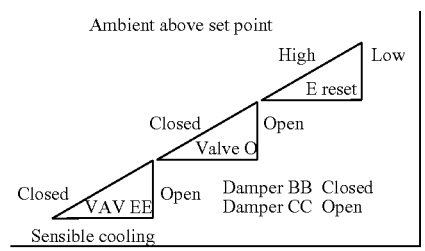<br>Sensible cooling<br><br>In response to the warmest zone space dry bulb temperature input device 1, the following control actions in sequence will increase the cooling capacity to maintain the desired space dry bulb temperature set point:<br>Modulate the sensible cooling heat exchanger control valve O from closed to open.<br>Vary the cooling medium reset algorithm 5 from high to low to reset the cold cooling medium generator (chiller) DD flow temperature from warm to cold. |
| 4 | Latent cooling control algorithm<br>The latent cooling control algorithm 4 determines the amount of latent cooling to be provided from the heat exchangers D, E and F to offset the conditioned space and ventilation air flow latent cooling requirement. |

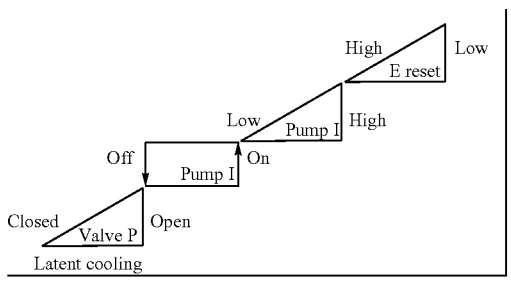

In response to the space relative humidity input device 2, the following control
actions in sequence will increase the dehumidification capacity to maintain
the desired space relative humidity set point:
Modulate the dehumidification cooling heat exchanger control valve P from
closed to open.
Energize the heat transfer pump I.
Vary the speed of the heat transfer pump I from low to high.
Vary the cooling medium reset algorithm 5 from high to low to reset the
cold cooling medium generator (chiller) DD flow temperature from warm to
cold.

| | |
|---|---|
| 5 | Cooling medium reset algorithm |
| | The cooling medium reset algorithm 5 accepts feedback from the high select zone space dry bulb temperature input device 1 and the space relative humidity input device 2 to determine whether the cold cooling medium M is acceptable to achieve the targeted dry bulb and relative humidity conditions. If either the targeted space dry bulb temperature or space relative humidity is not achieved, the cold cooling medium generator (chiller) DD flow temperature is reset lower. |
| 6 | Space environmental management system |
| | The space environmental management system 6 is a computer based control system that accepts input from the space dry bulb temperature input device 1 and the space relative humidity input device 2 and, through the sensible cooling control algorithm 3 and the latent cooling control algorithm 4, provides output to the sensible cooling heat exchanger control valve O and the dehumidification cooling heat exchanger control valve P to achieve the targeted space dry bulb temperature and relative humidity. |
| | The space environmental management system 6 accepts input from the space dry bulb temperature input device 1 and, through the sensible heating control algorithm 8, provides output to the sensible heating heat exchanger control valve T to achieve the targeted space dry bulb temperature. |
| 7 | Sensible heating control algorithm |
| | The sensible heating control algorithm 7 determines the amount of sensible heating to be provided from the zone variable volume boxes EEa, EEb, etc and the heat exchangers D, F and G to offset the zone conditioned spaces and the ventilation air flow sensible heating requirement. |
| | This control sequence is activated only when all zone variable volume boxes EEa, EEb, etc require sensible heating. |
| | During this heating mode, the return air damper CC will be open and the ambient relief air damper BB will be closed. |
| | The zone variable volume boxes EEa, EEb, etc will operate individually. |

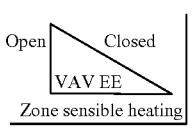

In response to the space dry bulb temperature input device 1a, the following
control action will increase the heating capacity to maintain the desired space
dry bulb temperature set point:
Modulate the zone variable volume box from closed to open.
(Where reheat facility is provided within the zone variable volume boxes EEa,
EEb, etc, operation of the reheater will be de-energized.)
The delivery of thermal capacity from the heat exchangers D, F and G will be
determined by the zone variable volume box with the highest sensible heating
demand.

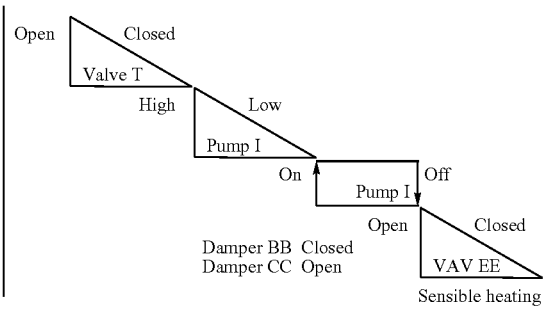

In response to the space dry bulb temperature input device 1, the following control actions in sequence will increase the heating capacity to maintain the desired space dry bulb temperature set point:
When the latent cooling control algorithm 4 is active, and input from the space dry bulb temperature input device 1 is below set point,
energize the heat transfer pump I.
vary the speed of the heat transfer pump I from low to high.
When the latent cooling control algorithm 4 is not active, and input from the space dry bulb temperature input device 1 is below set point,
modulate the outdoor air stream sensible heating heat exchanger control valve T from closed to open.

8    Cold cooling medium flow algorithm
The cold cooling medium flow algorithm 8 limits the flow of the cold cooling medium (M and S). Input from the cold cooling medium flow meter R is compared to the determined maximum cold cooling medium flow rate and retards the action of the sensible cooling heat exchanger control valve O and the dehumidification cooling heat exchanger control valve P to limit the flow of cold cooling medium (M and S) to the determined maximum flow rate.

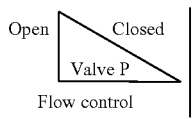

In response to the cooling medium flow meter R, the following control actions in unison sequence will retard the cooling medium flow to limit flow to the desired cold cooling medium flow rate set point:
Modulate the dehumidification cooling heat exchanger control valve P from open to closed.
Modulate the sensible cooling heat exchanger control valve O from open to closed.

9    Supply air fan control
The supply air fan control algorithm 9 determines the amount of conditioned space supply air W delivered to the zone variable volume boxes EEa, EEb, etc.
The amount of conditioned space supply air W will be determined by the zone variable volume box with the highest demand for airflow required for either sensible cooling or sensible heating.

In response to the space dry bulb temperature input device 1a, the following control action will increase the speed of the primary air fan Z to maintain the desired space dry bulb temperature set point:
Modulate the primary air fan Z from low speed to high speed.

10    Ventilation rate
The ventilation rate algorithm 10 maintains the amount of outdoor air B ventilation airflow. The amount of outdoor air B ventilation airflow delivered will be maintained in response to the ventilation airflow sensor FF.

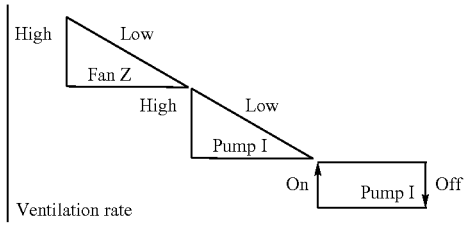
Ventilation rate

In response to the ventilation airflow sensor FF, the following control actions in sequence will increase the outdoor air B ventilation airflow to maintain the ventilation airflow set point:
When latent cooling control algorithm 4 is active, and input from the ventilation airflow sensor FF is below set point,
energize the heat transfer pump I.
vary the speed of the heat transfer pump I from low to high.
When latent cooling control algorithm 4 is not active, and input from the ventilation airflow sensor FF is below set point,
modulate the primary air fan Z from low speed to high speed.

11   Supply air temperature reset
The supply air temperature reset algorithm 11 raises the conditioned space supply air W temperature to minimize the requirement for thermal heating. The amount of conditioned space primary air W will be determined by the zone variable volume box with the lowest demand for airflow required for sensible cooling.
In response to the space dry bulb temperature input device 1a, the following control action will increase the speed of the heat transfer pump I, and the primary air fan Z, to maintain the desired space dry bulb temperature set point:

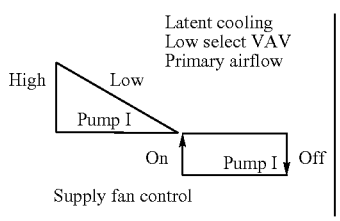
Supply fan control

In response to the space dry bulb temperature input device 1a, the following control actions in sequence will increase raises the conditioned space supply air W temperature to minimize the requirement for thermal heating:
When latent cooling control algorithm 4 is active, and input from the space dry bulb temperature input device 1 a is below set point,
energize the heat transfer pump I.
vary the speed of the heat transfer pump I from low to high.

12   Return air fan control
The return air fan control algorithm 12 increases the speed of the return air fan AA to enable sensible cooling capacity from the return air stream A passing over the heat exchanger H and sensible cooling capacity from ambient air that is cooler than the space dry bulb temperature set point. As demand for conditioned space supply air W, as indicated by the conditioned space supply airflow sensor HH increases, the speed of the return air fan AA will increase in response to the return air airflow sensor GG and the ventilation airflow sensor FF.

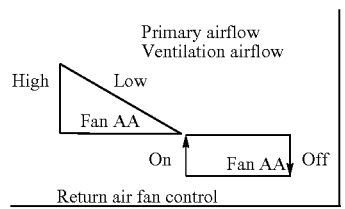
Return air fan control

The return air fan control algorithm 12 will determine the return airflow set point in accordance with the following arithmetical equation:
Set point 12 = HH − FF
The speed of return air fan AA will be controlled in to achieve the return air fan speed set point.
Energize return air fan AA.
Modulate return air fan AA from low speed to high speed.

With regard to the second embodiment and its psychrometric chart shown in FIG. 2b, the psychrometric process is as follows: the first heat exchanger D pre-cools the outdoor air; the second heat exchanger E uses chilled water to dehumidify the outdoor air; and the third heat exchanger F shifts energy to the first heat exchanger D to pre-cool. The cooling process for the return air stream A is principally sensible cooling, which is conducted in the return air sensible cooling treatment stage represented by the heat exchanger H placed in the return air stream A.

By way of summary with regard to the second embodiment of FIGS. 2a and 2b, the psychrometric solution is again achieved using separate air paths. As the Shaw system uses the outdoor air stream to dehumidify prior to mixing, this second embodiment of the present invention uses the Shaw methodology, again extended to four heat transfer processes. Utilising heat reclaim permits variability in the separation from the saturation curve that can be regulated to satisfy conditioned space conditions with minimal or eliminated need for reheat. When additional sensible cooling is required the supply airflow increases and is ideally regulated by load.

Turning now to the third embodiment of the present invention, and again as mentioned above, the third embodiment is a low dew point control process that extends the Shaw system beyond normal air conditioning space requirements. The air conditioning system of the third embodiment again includes an outdoor air latent cooling treatment stage and a return air sensible cooling treatment stage, but does so utilizing four dehumidification cooling steps, including two heat reclaim steps and one sensible cooling step, to provide energy improvements.

Figure 3A:
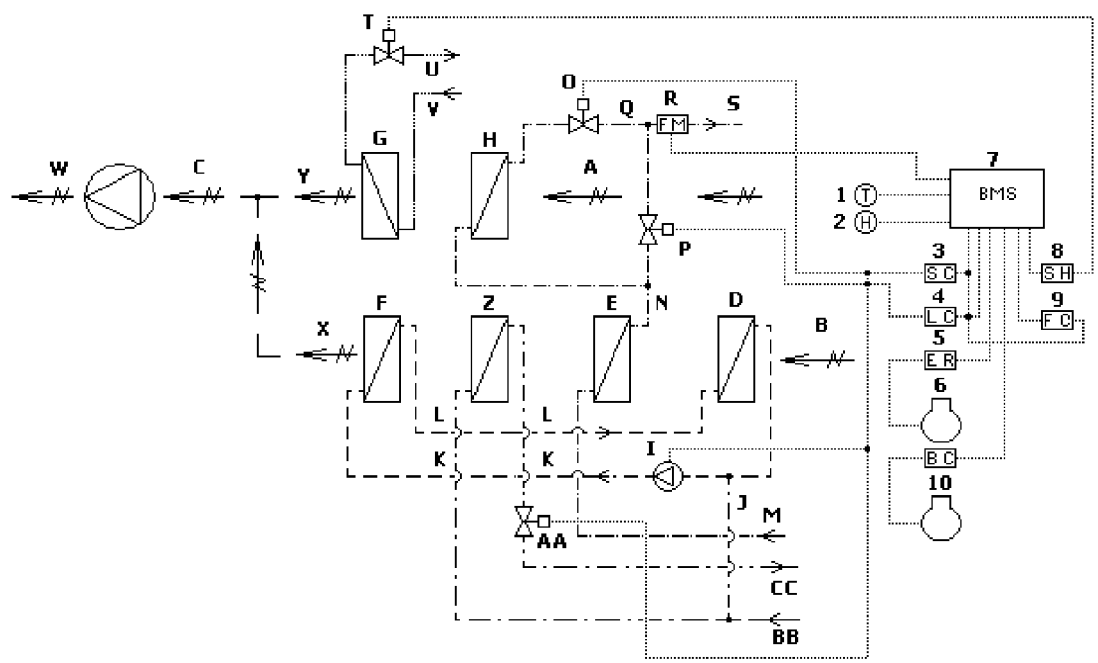
FIG. 3a is a flow diagram of a third embodiment of an air conditioning system in accordance with the present invention.
Figure 3B:
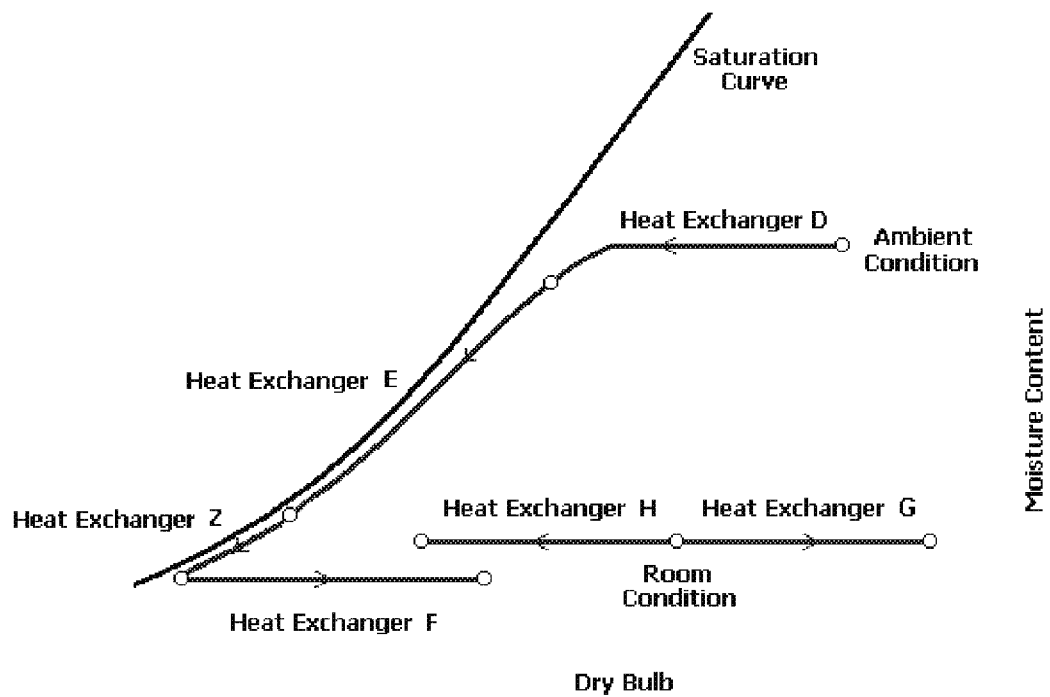

This third embodiment is illustrated by the flow diagram of FIG. 3a and the psychrometric chart of FIG. 3b. For ease of understanding, the following description will first provide a general overview of the flow diagram of FIG. 3a, followed by a more detailed explanation (in a table) of the different elements of the flow diagram. A brief explanation of the psychrometric chart of FIG. 3b will then be provided.

Illustrated in FIG. 3a is an air conditioning system that again relies on outdoor air B for ventilation being psychrometrically treated separately from the return air A to achieve independent control of latent and sensible cooling, this third embodiment being able to successfully use high proportions of outdoor air B as is required by some specialist buildings such as manufacturing laboratories.

Again, the cooling process for the outdoor air stream B is principally latent cooling, which is conducted in the outdoor air latent cooling treatment stage. In the outdoor air latent cooling treatment stage, the outdoor air B is treated via heat exchangers (D, E, Z and F) four times, this representing an extra heat exchange step in the outdoor air latent cooling treatment stage compared to the first and second embodiments.

The first heat exchanger D pre-cools the outdoor air B utilising reclaimed energy, reducing the dry bulb temperature and commencing the dehumidifying process. The second heat exchanger E dehumidifies the outdoor air B to an intermediate absolute humidity level. The third heat exchanger Z utilises a colder heat exchange medium (a super cooling medium such as brine) to provide additional dehumidification to an absolute humidity level that will achieve the desired relative humidity level within the conditioned space. This third heat exchanger Z thus provides the air conditioning system of an embodiment of the present invention with an ability to deal with lower conditioned space absolute humidity requirements.

The fourth heat exchanger F reclaims sensible heat that is not required to satisfy the conditioned space sensible cooling load. The result of this fourth stage of heat exchange is again a separation of the air stream from the saturation curve. The amount of the separation is regulated by a heat transfer pump I connecting the first exchanger D to the fourth heat exchanger F.

The cooling process for the return air stream A is again principally sensible cooling, which is conducted in the return air sensible cooling treatment stage. In the return air sensible cooling treatment stage, and where additional sensible cooling is required, a further heat exchanger H is placed in the return air stream.

The principal heat exchange medium (which in this third embodiment is again the chilled water) is used to maximize heat exchanger efficiency. The cold entering flow is used to provide the driving potential for the second heat exchanger E in the outdoor air latent cooling treatment stage, the subsequently warmed medium then passing to the further heat exchanger H of the return air sensible cooling treatment stage.

The delivery temperature for the chilled water is again regulated by a demand from the conditioned space conditions and to achieve optimum performance between the principal cold generator (for the chilled water) and the super cooling cold generator (for the brine). When maximum flow conditions have been provided to the heat exchangers, and the conditioned space conditions require additional dehumidification or sensible cooling, the delivery temperature of the chilled water is scheduled down to achieve additional heat exchange, which leads to satisfaction of the conditioned space dry bulb and relative humidity requirements. Where additional dehumidification is required, the delivery temperature of the brine will be set to achieve the conditioned space absolute humidity set point.

Sensible heating for the conditioned space is achieved by the addition of a heat exchanger G in either the return air A) or the outdoor air B streams, in this embodiment (unlike in the first and second embodiments) being shown in the path of the return air stream A. Heating can also be provided by a condenser water heat exchanger. Again, latent heating is not provided in this third embodiment.

Following separate treatment of the outdoor air B and the return air A, the two air streams can be mixed to provide a single air stream W to be delivered to the space to be conditioned.

The following table provides a more detailed explanation of the various elements illustrated in the flow diagram of FIG. 3a:

| | |
|---|---|
| A | Return air (sensible cooling) stream<br>Air recirculated from the conditioned space will be typically used to act as the medium to provide sensible cooling to the conditioned space. |
| B | Outdoor air (dehumidification) stream<br>Air that is provided for ventilation of the space will be typically used to act as the medium to provide latent cooling to the conditioned space. |

| | |
|---|---|
| C | Supply air stream
Air that is delivered to the conditioned space will be cooled to offset the heat load within the conditioned space. The heat load of the space will require a varying ratio and quantum of sensible and latent cooling dependent on the variability of ambient and conditioned space heat in and out flow. |
| D | Outdoor air stream pre cooling heat exchanger
The outdoor air stream B passes over the heat exchanger D. A heat reclaim cooling medium (L to K) passes through the heat exchanger D. The direction of flow is counter flow; the warmer airflow is cooled by the warmer cooling medium flow-the cooler airflow is cooled by the cooler medium flow. The outdoor air stream B gives up heat to the heat reclaim cooling medium. The outdoor air steam B will be achieve sensible cooling and, depending on the cooling medium flow temperature, latent cooling may also be achieved. |
| E | Outdoor air stream dehumidification heat exchanger
The outdoor air stream B passes over the heat exchanger E. A cooling medium (M to N) passes through the heat exchanger E. The direction of flow is counter flow; the warmer airflow is cooled by the warmer cooling medium flow-the cooler airflow is cooled by the cooler medium flow. The outdoor air stream B gives up heat to the cooling medium. The outdoor air steam B will achieve principally latent cooling, although sensible cooling will also be achieved. |
| F | Outdoor air stream heat reclaim heat exchanger
The outdoor air stream B passes over the heat exchanger F. A heat reclaim heating medium (K to L) passes through the heat exchanger F. The direction of flow is counter flow; the warmer airflow is heated by the warmer heating medium flow-the cooler airflow is heated by the cooler medium flow. The outdoor air stream B takes up heat from the heat reclaim heating medium. The outdoor air steam B will achieve sensible heating-no latent heat exchange will be achieved. |
| G | Outdoor air stream heating heat exchanger
The outdoor air stream B passes over the heat exchanger G. A heating medium (V to U) passes through the heat exchanger F. The direction of flow is counter flow; the warmer airflow is heated by the warmer heating medium flow-the cooler airflow is heated by the cooler medium flow. The outdoor air stream B takes up heat from the heating medium. The outdoor air steam B will achieve sensible heating-no latent heat exchange will be achieved. |
| H | Return air stream sensible cooling heat exchanger
The return air stream A passes over the heat exchanger H. A cooling medium (N to Q) passes through the heat exchanger H. The direction of flow is counter flow; the warmer airflow is cooled by the warmer cooling medium flow-the cooler airflow is cooled by the cooler medium flow. The return air stream A gives up heat to the cooling medium. The return air steam A will achieve sensible cooling and, depending on the cooling medium flow temperature, latent cooling may also be achieved. |
| I | Heat transfer pump
The heat transfer pump I generates flow through the heat reclaim medium piping circuit (K and L) and two heat exchangers (D and F). The sequence of flow through the heat reclaim piping circuit is as follows: flow generated by the heat transfer pump I passes through the pipe K, through the heat exchanger F, through the pipe L, and then through the heat exchanger D, returning to the heat transfer pump I. |
| J | Feed and expansion pipe
The feed and expansion pipe J connects the heat reclaim piping circuit (K and L) to the cooling medium circuit M. The connection fills the heat reclaim piping circuit with a heat exchange medium from the cooling medium circuit M. The connection also permits temperature generated expansion and contraction within the heat reclaim circuit (K and L). |
| K | Warm heat reclaim pipe
The warm heat reclaim pipe transfers warm heat reclaim medium from the heat exchanger D to the heat exchanger F. |
| L | Cool heat reclaim pipe
The cool heat reclaim pipe transfers cool heat reclaim medium from the heat exchanger F to the heat exchanger D. |
| M | Cold cooling medium pipe
The cold cooling medium pipe transfers cold cooling medium from the cold generator (chiller) 6 to the outdoor air dehumidification heat exchanger E. |
| N | Inter stage cooling medium pipe
The inter stage cooling medium pipe transfers cool cooling medium from the outdoor air dehumidification heat exchanger E to either the sensible cooling heat exchanger H or the return pipe to the cold generator (chiller) 6. |
| O | Sensible cooling heat exchanger control valve
The sensible cooling heat exchanger control valve O regulates the amount of flow of cool heat exchange medium N that passes through the sensible cooling heat exchanger H. An increase in flow of the cool heat exchange cooling medium increases the amount of heat exchange achieved by the sensible cooling heat exchanger H. As a consequence of cool cooling medium flow, the return air steam A will achieve sensible cooling and, depending on the cooling medium flow temperature and flow rate, latent cooling may also be achieved. |

| | -continued |
|---|---|
| P | Dehumidification heat exchanger control valve |
| | The dehumidification cooling heat exchanger control valve P regulates the amount of flow of cold heat exchange medium M that passes through the dehumidification heat exchanger E. An increase in flow of the cold heat exchange cooling medium increases the amount of heat exchange achieved by the dehumidification heat exchanger E. As a consequence of cold cooling medium flow, the outdoor air steam B will achieve latent cooling. Sensible cooling will also be achieved at a rate determined by the dehumidification process. |
| | Where there is an absence of a dehumidification requirement, and where there is a sensible cooling requirement, the dehumidification cooling heat exchanger control valve P will also be required to regulate the amount of flow of the cold cheat exchange medium M. An increase in flow of the cold heat exchange cooling medium increases the amount of heat exchange achieved by the dehumidification heat exchanger. As a consequence of cold cooling medium flow, the outdoor air steam B will achieve sensible cooling. Depending on the cooling medium flow temperature, latent cooling may also be achieved. |
| Q | Warm cooling medium pipe |
| | The warm cooling medium pipe Q transfers warm cooling medium from heat exchanger H back to the cold generator (chiller) 6. |
| R | Cooling medium flow meter |
| | The cooling medium flow meter R measures the amount of flow in the return cooling medium pipe S. |
| S | Return cooling medium pipe |
| | The return cooling medium pipe S transfers the mixed return cooling medium back to the cold generator (chiller) 6. Cooling medium that has been utilized in the dehumidification heat exchanger E and the sensible cooling heat exchanger H come together to then return to the cold generator (chiller) 6. |
| T | Outdoor air stream sensible heating heat exchanger control valve |
| | The outdoor air stream sensible heating heat exchanger control valve T regulates the amount of flow of hot heat exchange medium V that passes through the outdoor air sensible heating heat exchanger G. An increase in flow of the hot heat exchange heating medium increases the amount of heat exchange achieved by the outdoor air sensible heating heat exchanger G. The outdoor air steam B will achieve sensible heating-no latent heat exchange will be achieved. |
| U | Hot heating medium pipe |
| | The hot heating medium pipe U transfers hot heating medium from the sensible heating heat exchanger G through a heat generator (not shown) to the outdoor air stream dehumidification heat exchanger E. |
| V | Warm heating medium pipe |
| | The warm return heating medium pipe V transfers the warm heating medium from the outdoor air stream dehumidification heat exchanger E back to the heat generator. |
| W | Conditioned space supply air |
| | The conditioned space supply air W is a mixture of the outdoor air stream B and the return air stream A. The conditioned space supply air stream W transports sensible and latent cooling, and sensible heating potential, from the series and parallel heat exchangers D, E, F, G and H to offset the conditioned space and ventilation airflow heat load to provide the targeted dry bulb and relative humidity conditions. |
| X | Treated outdoor air stream |
| | The treated outdoor air stream X transports sensible and latent cooling, and sensible heating potential, from the series heat exchangers D, E, F and G. |
| Y | Treated return air stream |
| | The treated return air stream Y transports sensible and latent cooling from the heat exchanger G. |
| Z | Outdoor air stream super dehumidification heat exchanger |
| | The outdoor air stream B passes over the heat exchanger Z. A super cooling medium (BB to CC) passes through the heat exchanger ZZ. The direction of flow is counter flow; the warmer airflow is cooled by the warmer cooling medium flow-the cooler airflow is cooled by the cooler medium flow. The outdoor air stream B gives up heat to the cooling medium. The outdoor air steam B will achieve principally latent cooling, although some sensible cooling will also be achieved. |
| AA | Super dehumidification heat exchanger control valve |
| | The super dehumidification cooling heat exchanger control valve AA regulates the amount of flow of cold heat exchange medium BB that passes through the dehumidification heat exchanger E. An increase in flow of the super cold heat exchange cooling medium increases the amount of heat exchange achieved by the super dehumidification heat exchanger Z. As a consequence of super cold cooling medium flow, the outdoor air steam B will achieve latent cooling. Sensible cooling will also be achieved at a rate determined by the dehumidification process. |
| BB | Cold super cooling medium pipe |
| | The cold super cooling medium pipe BB transfers super cold cooling medium from the super cold generator (brine chiller) to the outdoor air stream super dehumidification heat exchanger Z. |

| | |
|---|---|
| CC | Warm super cooling medium pipe |
| | The warm super cooling medium pipe 'CC' transfers warm super cooling medium from super dehumidification heat exchanger 'Z' back to the super cold generator (brine chiller) 10. |
| 1 | Space dry bulb temperature input device |
| | The space dry bulb temperature input device 1 measures the conditioned space dry bulb temperature as an input to the space environmental management system 7. |
| 2 | Space relative humidity input device |
| | The space relative humidity input device 2 measures the conditioned space relative humidity as an input to the space environmental management system '7'. |
| 3 | Sensible cooling control algorithm |
| | The sensible cooling control algorithm 3 determines the amount of sensible cooling to be provided from the heat exchangers H and E to offset the conditioned space and ventilation air flow sensible cooling requirement. |
| | 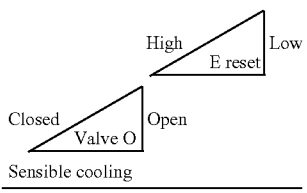 |
| | In response to the space dry bulb temperature input device 1, the following control actions in sequence will increase the cooling capacity to maintain the desired space dry bulb temperature set point: |
| | Modulate the sensible cooling heat exchanger control valve O from closed to open. |
| | Vary the cooling medium reset algorithm 5 from high to low to reset the cold cooling medium generator (chiller) 6 flow temperature from warm to cold. |
| 4 | Latent cooling control algorithm |
| | The latent cooling control algorithm 4 determines the amount of latent cooling to be provided from the heat exchangers D, E, F and Z to offset the conditioned space and ventilation air flow latent cooling requirement. |
| | 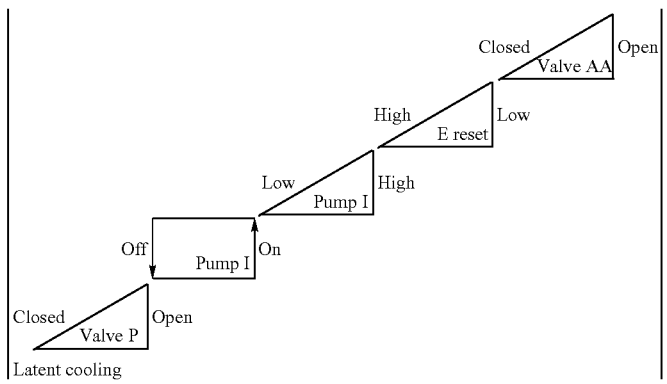 |
| | In response to the space relative humidity input device 2 the following control actions in sequence will increase the dehumidification capacity to maintain the desired space relative humidity set point: |
| | Modulate the dehumidification cooling heat exchanger control valve P from closed to open. |
| | Energize the heat transfer pump I. |
| | Vary the speed of the heat transfer pump I from low to high. |
| | Vary the cooling medium reset algorithm 5 from high to low to reset the cold cooling medium generator (chiller) flow temperature from warm to cold. |
| | Modulate the super dehumidification cooling heat exchanger control valve AA from closed to open. |
| 5 | Cooling medium reset algorithm |
| | The cooling medium reset algorithm 5 accepts feedback from the space dry bulb temperature input device 1 and space relative humidity input device 2 to determine whether the cold cooling medium M is acceptable to achieve the targeted dry bulb and relative humidity conditions. If either the targeted space dry bulb temperature or space relative humidity is not achieved the cold cooling medium generator (chiller) flow temperature is reset. |
| 6 | Cold cooling medium generator (chiller) |
| | The cold cooling medium generator (chiller) 6 is a mechanical device that removes the heat energy absorbed by the heat exchangers E and H. |

| | |
|---|---|
| 7 | Space environmental management system<br>The space environmental management system 7 is a computer based control system that accepts input from the space dry bulb temperature input device 1 and space relative humidity input device 2 and through the sensible cooling control algorithm 3 and the latent cooling control algorithm 4 provides output to the sensible cooling heat exchanger control valve O and dehumidification cooling heat exchanger control valve P to achieve the targeted space dry bulb temperature and relative humidity.<br>The space environmental management system 7 accepts input from the space dry bulb temperature input device 1 and through the sensible heating control algorithm 8 provides output to the sensible heating heat exchanger control valve T to achieve the targeted space dry bulb temperature. |
| 8 | Sensible heating control algorithm<br>The sensible heating control algorithm 8 determines the amount of sensible heating to be provided from the heat exchangers D, F and G to offset the conditioned space and ventilation air flow sensible heating requirement.<br>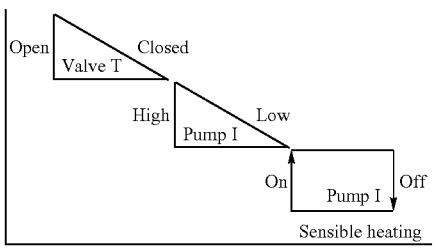<br>In response to the space dry bulb temperature input device 1 the following control actions in sequence will increase the heating capacity to maintain the desired space dry bulb temperature set point:<br>When latent cooling control algorithm 4 is active and input from the space dry bulb temperature input device 1 is below set point<br>Energize the heat transfer pump I.<br>Vary the speed of the heat transfer pump I from low to high.<br>When latent cooling control algorithm 4 is not active and input from the space dry bulb temperature input device 1 is below set point<br>Modulate the dehumidification air stream sensible heating heat exchanger control valve T from closed to open. |
| 9 | Cold cooling medium flow algorithm<br>The cold cooling medium flow algorithm 9 limits the flow of the cold cooling medium (M and S). Input from the cold cooling medium flow meter R is compared to the determined maximum cold cooling medium flow rate and retards the action of the dehumidification heat exchanger control valve P to limit the flow of cold cooling medium (M to S) to the determined maximum flow rate.<br>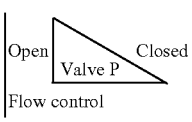<br>In response to the cooling medium flow meter R the following control actions in unison sequence will retard the cooling medium flow to limit flow to the desired cold cooling medium flow rate set point:<br>Modulate the dehumidification cooling heat exchanger control valve P from open to closed. |
| 10 | Super cold cooling medium (brine chiller)<br>The cold cooling medium flow algorithm 10 initiates flow (operation) of the super cold cooling medium (brine chiller) 10 (BB and CC). The super cooling medium 10 accepts feedback from the space dehumidification input device 2 to determine whether the super cold cooling medium BB is required to achieve the targeted relative humidity condition. The super cooling medium BB delivery temperature is fixed (not variable) and is determined by the required dew point of the space less a heat exchanger approach temperature differential. |

With regard to the third embodiment and its psychrometric chart shown in FIG. 3b, the psychrometric process is as follows: the outdoor air dehumidification pre-cooling heat exchanger D pre-cools the outdoor air B; the outdoor air dehumidification heat exchanger E uses chilled water (M to N) to dehumidify the outdoor air B; the outdoor air super dehumidification heat exchanger Z (being a brine heat exchanger) further dehumidifies the outdoor air B to achieve the required conditioned space relative humidity; and the outdoor air heat reclaim heat exchanger F shifts energy to the first heat exchanger D to pre-cool the outdoor air B to commence the dehumidification process. The cooling process for the return air stream A is principally sensible cooling, which is conducted in the return air sensible cooling treatment stage. In the return air sensible cooling treatment stage, and where additional sensible cooling is required for the air conditioning system, an extra heat exchanger G is placed in the return air stream A.

By way of summary with regard to the third embodiment of FIGS. 3a and 3b, again the psychrometric solution is achieved using separate air paths. As the Shaw system uses the outdoor air stream to dehumidify prior to mixing, the third embodiment uses the Shaw methodology extended to four heat transfer processes (being similar to the three heat transfer processes of the first and second embodiments, but with an additional heat transfer process added). The advantage of this is the utilisation of lower efficiency energy sources to provide the high demand psychrometric process, and the re-utilisation of this higher efficiency energy sources for the generation to pre-cool for the ultimate dehumidification process. Overcooling, often reheated with a primary heating source (as with conventional design theory), is replaced with heat reclaim and the heat of rejection (condenser water) used in the refrigeration cycle cooling process, thereby eliminating a primary heating requirement and reducing energy consumption.

In conclusion, it must be appreciated that there may be other variations and modifications to the configurations described herein which are also within the scope of the present invention.

I claim:

1. An air conditioning system, the air conditioning system being capable of treating a conditioned space by treating outdoor air from outside the conditioned space and return air from inside the conditioned space, and mixing the outdoor air with the return air to form supply air for the conditioned space, the air conditioning system including:
   an outdoor air latent cooling treatment stage configured to provide parallel airflow with a return air sensible cooling treatment stage, and
   a means for mixing outdoor air with return air to form conditioned space supply air,
wherein the outdoor air latent cooling treatment stage includes at least a dehumidification heat exchanger, combination pre-cooling and heat reclaim heat exchangers, and a heat transfer pump, and the return air sensible cooling treatment stage includes at least a sensible cooling heat exchanger, wherein the heat exchange medium for the sensible cooling heat exchanger is passed in series with the dehumidification heat exchanger.

2. The air conditioning system according to claim 1, wherein the configuration of the outdoor air latent cooling treatment stage and the return air sensible cooling treatment stage will be such that both treatments are conducted on their respective airflows prior to mixing, the mixing means thus being capable of mixing treated outdoor air with treated return air to form the conditioned space supply air.

3. The air conditioning system according to claim 1, wherein the outdoor air latent cooling treatment stage includes at least a dehumidification heat exchanger, combination pre-cooling and heat reclaim heat exchangers, and a heat transfer pump to deliver a dehumidified air stream with variable dry bulb separation from the saturation curve.

4. The air conditioning system according to claim 1, which includes at least one variable return air bypass damper, a variable supply-air speed controller, and a variable return-air speed controller in order to satisfy multiple variable sensible load requirements to maintain a general conditioned space relative humidity requirement.

5. The air conditioning system according to claim 1, wherein the outdoor air latent cooling treatment stage includes three dehumidification heat exchangers that can satisfy low absolute humidity requirements with the use of two primary cold generators, a heat reclaim heat exchanger to shift energy from the low absolute dehumidification process to the pre-cooling, and a heat reclaim heat exchanger to reheat, when necessary, from either of the cold generators' heat of rejection condenser water systems.

6. The air conditioning system according to claim 5, wherein the flow temperature of each cold generator is modulated to minimize energy consumption.

7. The air conditioning system according to claim 1, wherein the system includes a first chilled water heat exchanger in the outdoor air stream to provide latent cooling to achieve upper limit humidity control, and a second chilled water heat exchanger in the return air stream to provide additional sensible cooling to satisfy conditioned space dry bulb conditions.

8. The air conditioning system according to claim 7, wherein the dehumidification sensible heat transfer stage includes two heat exchangers partnered to the outdoor air dehumidification heat exchanger to regulate the amount of sensible cooling provided as part of the dehumidification process.

9. The air conditioning system according to claim 7, wherein sensible cooling that is required to depress the outdoor air to achieve dehumidification is reclaimed by an additional heat exchanger and a circulating pump in a closed circuit and is transferred to the pre-cooling heat exchanger.

10. The air conditioning system according to claim 7, wherein a control system is configured to manage the conditioned space conditions as follows:
   the outdoor air dehumidification heat exchanger provides the required latent cooling;
   the return air heat exchanger provides additional sensible cooling beyond that provided by the dehumidification process; and
   when the dehumidification process provides more sensible cooling than the conditioned space requires, the heat reclaim system transfers the surplus sensible cooling post dehumidification (saturation separation) to cooling required to initiate the dehumidification process.

11. The air conditioning system according to claim 1, wherein variable volume boxes are used to satisfy the requirements for two or more thermal sensible zones in the conditioned space.

12. The air conditioning system according to claim 11, including a bypass damper that, when the outdoor air has the ability to provide cooling to the conditioned space, regulates additional outdoor air to satisfy the conditioned space load.

13. The air conditioning system according to claim 12, wherein a return air fan operating in response to conditioned space loads functions in conjunction with the bypass damper to introduce additional return air and to maintain conditioned space conditions.

14. The air conditioning system according to claim 13, wherein the return air fan is capable of achieving a differential between the supply air and the return air that is equivalent to the minimum required minimum outdoor air quantity.

15. The air conditioning system according to claim 14, including multiple sub zones for the delivery of air to multiple variable air volume (VAV) boxes to manage the conditioned space, wherein a control system is configured to manage the conditioned space conditions as follows:
   when the outdoor air dry bulb temperature and absolute humidity level are both less than the desired conditioned space condition, the quantity of outdoor air is varied to satisfy the conditioned space dry bulb conditions;
   the outdoor air dehumidification heat exchanger provides latent cooling to satisfy the general conditioned space requirements;
   when the outdoor air latent cooling treatment stage provides insufficient sensible cooling to satisfy the conditioned space sensible cooling requirements, the return air fan is employed with the return air sensible cooling heat exchanger providing additional sensible cooling; and when the dehumidification process provides more sensible cooling than the conditioned space requires, the heat reclaim system transfers the surplus sensible cooling post dehumidification (saturation separation) to cooling required to initiate the dehumidification process.

16. The air conditioning system according to claim 1, including chilled water as a primary heat exchange medium, brine as a secondary heat exchange medium, and a chilled water heat exchanger and a brine heat exchanger in the outdoor air stream to provide latent cooling to achieve upper limit humidity control.

17. The air conditioning system according to claim 16, including a further chilled water heat exchanger in the return air stream to provide additional sensible cooling to satisfy conditioned space dry bulb conditions.

18. The air conditioning system according to claim 17, wherein, where a low absolute humidity is required for the conditioned space, wherein a control system is configured to manage the conditioned space conditions as follows:

a first stage outdoor air dehumidification heat exchanger provides an initial dehumidification process to satisfy the conditioned space latent cooling requirements, utilising cold energy produced by a chilling plant with a high coefficient of performance;

a second stage outdoor air dehumidification heat exchanger provides the final dehumidification process to satisfy the conditioned space latent cooling requirements, utilising cold energy produced by a chilling plant with a coefficient of performance less than the first stage dehumidification process chilling plant;

a return air heat exchanger provides additional sensible cooling beyond that provided by the first and second stage dehumidification processes;

when the dehumidification process provides more sensible cooling than the conditioned space requires, the heat reclaim system transfers the surplus sensible cooling post dehumidification (saturation separation) to cooling required to initiate the dehumidification process; and when the potential to reclaim heat is not sufficient, supplementary heating can be provided by a higher energy source, heat being transferred from the heat of rejection (condenser water) of a refrigeration plant or from a conventional combustion fuel type system.

\* \* \* \* \*